US012568247B2

(12) United States Patent
Lee et al.

(10) Patent No.: US 12,568,247 B2
(45) Date of Patent: Mar. 3, 2026

(54) POINT CLOUD DATA TRANSMISSION DEVICE, POINT CLOUD DATA TRANSMISSION METHOD, POINT CLOUD DATA RECEPTION DEVICE, AND POINT CLOUD DATA RECEPTION METHOD

(71) Applicant: LG Electronics Inc., Seoul (KR)

(72) Inventors: Sooyeon Lee, Seoul (KR); Hyejung Hur, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 18/708,842

(22) PCT Filed: Oct. 4, 2022

(86) PCT No.: PCT/KR2022/014884

§ 371 (c)(1),
(2) Date: May 9, 2024

(87) PCT Pub. No.: WO2023/085609

PCT Pub. Date: May 19, 2023

(65) Prior Publication Data

US 2025/0008156 A1      Jan. 2, 2025

(30) Foreign Application Priority Data

Nov. 9, 2021      (KR) ........................ 10-2021-0152691

(51) Int. Cl.
*H04N 19/597*      (2014.01)
*H04N 19/105*      (2014.01)
*H04N 19/172*      (2014.01)

(52) U.S. Cl.
CPC ......... *H04N 19/597* (2014.11); *H04N 19/105* (2014.11); *H04N 19/172* (2014.11)

(58) Field of Classification Search
CPC ..... H04N 19/72; H04N 19/105; H04N 19/597
See application file for complete search history.

(56) References Cited

U.S. PATENT DOCUMENTS

| | | | | |
|---|---|---|---|---|
| 11,895,341 B2 * | 2/2024 | Oh | ........................ | H04N 19/119 |
| 11,902,348 B2 * | 2/2024 | Hur | ........................ | H04L 65/762 |
| 11,908,168 B2 * | 2/2024 | Lee | ........................ | G06T 9/001 |
| 11,968,393 B2 * | 4/2024 | Oh | ........................ | H04N 21/434 |
| 11,979,607 B2 * | 5/2024 | Oh | ........................ | H04N 19/597 |
| 12,010,341 B2 * | 6/2024 | Oh | ........................ | H04N 19/96 |
| 12,010,350 B2 * | 6/2024 | Oh | ........................ | H04N 19/124 |

(Continued)

FOREIGN PATENT DOCUMENTS

WO      WO 2021/215849 A1      10/2021

OTHER PUBLICATIONS

[No Author Listed], "G-PCC codec description V12," ISO/IEC JTC 1/SC 29/WG 7, N0151, Virtual, Jul. 2021, 150 pages.

(Continued)

*Primary Examiner* — Nathan J Flynn
(74) *Attorney, Agent, or Firm* — Fish & Richardson P.C.

(57) ABSTRACT

A point cloud data transmission method according to embodiments may comprise the steps of: encoding point cloud data; and transmitting a bitstream comprising the point cloud data. A point cloud data reception method according to embodiments may comprise the steps of: receiving a bitstream comprising point cloud data; and decoding the point cloud data.

14 Claims, 30 Drawing Sheets

(56) References Cited

U.S. PATENT DOCUMENTS

| | | | | |
|---|---|---|---|---|
| 12,021,910 | B2 * | 6/2024 | Lee | H04L 65/70 |
| 12,034,979 | B2 * | 7/2024 | Oh | H04N 19/593 |
| 12,058,370 | B2 * | 8/2024 | Park | H04N 19/70 |
| 12,069,316 | B2 * | 8/2024 | Oh | H04N 19/91 |
| 12,143,648 | B2 * | 11/2024 | Oh | H04N 19/597 |
| 12,149,579 | B2 * | 11/2024 | Oh | H04L 65/61 |
| 12,149,751 | B2 * | 11/2024 | Hur | H04N 19/91 |
| 12,159,435 | B2 * | 12/2024 | Oh | H04N 19/597 |
| 12,165,368 | B2 * | 12/2024 | Oh | G06T 17/00 |
| 12,184,895 | B2 * | 12/2024 | Hur | H04N 19/136 |
| 12,205,332 | B2 * | 1/2025 | Oh | G06T 17/00 |
| 12,236,646 | B2 * | 2/2025 | Oh | G06T 9/00 |
| 12,244,866 | B2 * | 3/2025 | Oh | H04N 19/96 |
| 12,250,414 | B2 * | 3/2025 | Hur | H04N 19/597 |
| 12,260,600 | B2 * | 3/2025 | Lee | H04N 19/119 |
| 12,262,055 | B2 * | 3/2025 | Hur | H04N 19/164 |
| 12,273,557 | B2 * | 4/2025 | Hur | H04N 19/597 |
| 12,299,938 | B2 * | 5/2025 | Park | G06T 9/001 |
| 12,299,942 | B2 * | 5/2025 | Oh | H04N 21/85406 |
| 12,299,943 | B2 * | 5/2025 | Oh | H04N 19/119 |
| 12,301,872 | B2 * | 5/2025 | Oh | H04N 19/597 |
| 2021/0099711 | A1 | 4/2021 | Tourapis et al. | |
| 2021/0104075 | A1 | 4/2021 | Mammou et al. | |
| 2021/0192798 | A1 | 6/2021 | Lasserre et al. | |

OTHER PUBLICATIONS

International Search Report and Written Opinion in International Appln. No. PCT/KR2022/014884, mailed on Jan. 20, 2023, 15 pages (with English translation).

Extended European Search Report in European Appln. No. 22893032. 7, mailed on Sep. 30, 2025, 13 pages.

ISO/IEC, "Technologies under Consideration in G-PCC," ISO/IEC JTC 1/SC 29/WG 7, MPEG 3D Graphics Coding, Convenorship: AFNOR (France), N00167, Aug. 2021, 44 pages.

Loi et al., "[G-PCC][New]Inter Prediction for Improved Quantization of Azimuthal Angle in Predictive Geometry Coding," 135. MPEG meeting, Motion Picture Expert Group or ISO/IEC JTC1/SC29/WG11, Online, m57351, Jul. 2021, 5 pages.

Ramasubramonian et al., "[G-PCC][New proposal] Improved inter prediction coding for predictive geometry," 136. MPEG meeting, Motion Picture Expert Group or ISO/IEC JTC1/SC29/WG11, Online, m58195, Oct. 2021, 3 pages.

Taquet et al., "[G-PCC][New] Improved Quantization of Azimuthal Angle in Predictive Geometry Coding," 133. MPEG meeting, Motion Picture Expert Group or ISO/IEC JTC1/SC29/WG11, Online, m55979, Jan. 2021, 10 pages.

* cited by examiner positions attributes

38000 — Transform coordinates

38006 — Transform colors

38001 — Quantize and remove points (voxelize)

38007 — Transfer attributes

38002 — Analyze octree

Reconstruct geometry

RAHT

38008

38009 — Gnnerate LOD

38003 — Analyze surface approximation

40010 — Lifting

38005

40011 — Quantize coefficients

38004 — Arithmetic encode

40012 — Arithmetic encode geometry bitstream atribute bitstream $$1 + 2 + 4 + 8 = 15$$

Level of details $q_n$ : n-th quantized azimuth
$R_{nm}$ : m-th radius for n-th quantized azimuth

FIG. 20

| mode | description |
| --- | --- |
| 0 | First node for quantized azimuth |
| 1 | Closest radius to previous decoded point |
| 2 | Closest but larger radius to previous decoded point |
| 3 | Closest but smaller radius to previous decoded point |
| 4 | Average radius |

FIG. 23

| seq_parameter_set_rbsp( ) { | Descriptor |
|---|---|
| ... | |
|    sps_interEnable | u(1) |
|    if(interEnable) { | |
|       numGroupOfFrame | ue(v) |
|       RadiusPredFlag | u(1) |
|       } | |
|    } | |
| ... | |
| } | |

FIG. 24

| geometry_parameter_set( ) { | Descriptor |
|---|---|
| ... | |
| gps_interEnable | u(1) |
| geom_tree_type | u(1) |
| ... | |
| if(geom_tree_type==1) { | |
| if(gps_interEnable){ | |
|    gps_RadiusPredFlag | u(1) |
|   if(gps_RadiusPredFlag) | |
|     radius_list_size_threshold | ue(v) |
| } | |
| } | |
| ... | |
| } | |

FIG. 25

| geometry_predtree_node(depth,nodeIdx) { | Descriptor |
|---|---|
| ... | |
| ptn_inter_flag[nodeIdx] | u(1) |
| | u(1) |
| if(ptn_inter_flag[nodeIdx]){ | |
|    ptn_refNode_flag[nodeIdx] | |
|    if(gps_RadiusPredFlag){ | u(1) |
|       ptn_radius_mode[nodeIdx] | ae(v) |
|    } | |
| } | |
| ... | |
| } | |

FIG. 26

| mode | description |
| --- | --- |
| 0000 | First node for quantized azimuth |
| 0001 | Closest radius to previous decoded point |
| 0010 | Closest but larger radius to previous decoded point |
| 0011 | Closest but smaller radius to previous decoded point |
| 0100 - 1111 | reserved |

FIG. 27

Receive bitstream including point cloud data — S3000

Decoding point cloud data — S3001

POINT CLOUD DATA TRANSMISSION DEVICE, POINT CLOUD DATA TRANSMISSION METHOD, POINT CLOUD DATA RECEPTION DEVICE, AND POINT CLOUD DATA RECEPTION METHOD

CROSS-REFERENCE TO RELATED APPLICATIONS

This application is a National Stage application under 35 U.S.C. § 371 of International Application No. PCT/KR2022/014884, filed on Oct. 4, 2022, which claims the benefit of Korean Application No. 10-2021-0152691, filed on Nov. 9, 2021. The disclosures of the prior applications are incorporated by reference herein in their entirety.

TECHNICAL FIELD

Embodiments relate to a method and device for processing point cloud content.

BACKGROUND

Point cloud content is content represented by a point cloud, which is a set of points belonging to a coordinate system representing a three-dimensional space. The point cloud content may express media configured in three dimensions, and is used to provide various services such as virtual reality (VR), augmented reality (AR), mixed reality (MR), and self-driving services. However, tens of thousands to hundreds of thousands of point data are required to represent point cloud content. Therefore, there is a need for a method for efficiently processing a large amount of point data.

SUMMARY

Embodiments provide a device and method for efficiently processing point cloud data. Embodiments provide a point cloud data processing method and device for addressing latency and encoding/decoding complexity.

The technical scope of the embodiments is not limited to the aforementioned technical objects, and may be extended to other technical objects that may be inferred by those skilled in the art based on the entire contents disclosed herein.

To achieve these objects and other advantages and in accordance with the purpose of the disclosure, as embodied and broadly described herein, a method of transmitting point cloud data may include encoding point cloud data, and transmitting a bitstream containing the point cloud data. In another aspect of the present disclosure, a method of receiving point cloud data may include receiving a bitstream containing point cloud data, and decoding the point cloud data.

Devices and methods according to embodiments may process point cloud data with high efficiency.

The devices and methods according to the embodiments may provide a high-quality point cloud service.

The devices and methods according to the embodiments may provide point cloud content for providing general-purpose services such as a VR service and a self-driving service.

BRIEF DESCRIPTION OF DRAWINGS

The accompanying drawings, which are included to provide a further understanding of the disclosure and are incorporated in and constitute a part of this application, illustrate embodiment(s) of the disclosure and together with the description serve to explain the principle of the disclosure. For a better understanding of various embodiments described below, reference should be made to the description of the following embodiments in connection with the accompanying drawings. The same reference numbers will be used throughout the drawings to refer to the same or like parts. In the drawings:

FIG. 20 illustrates modes for radius prediction according to embodiments;

FIG. 23 illustrates a sequence parameter set according to embodiments;

FIG. 24 illustrates a geometric parameter set according to embodiments;

FIG. 25 illustrates a geometry predictive tree node according to embodiments;

FIG. 26 illustrates a radius prediction mode according to embodiments;

Figure 27:
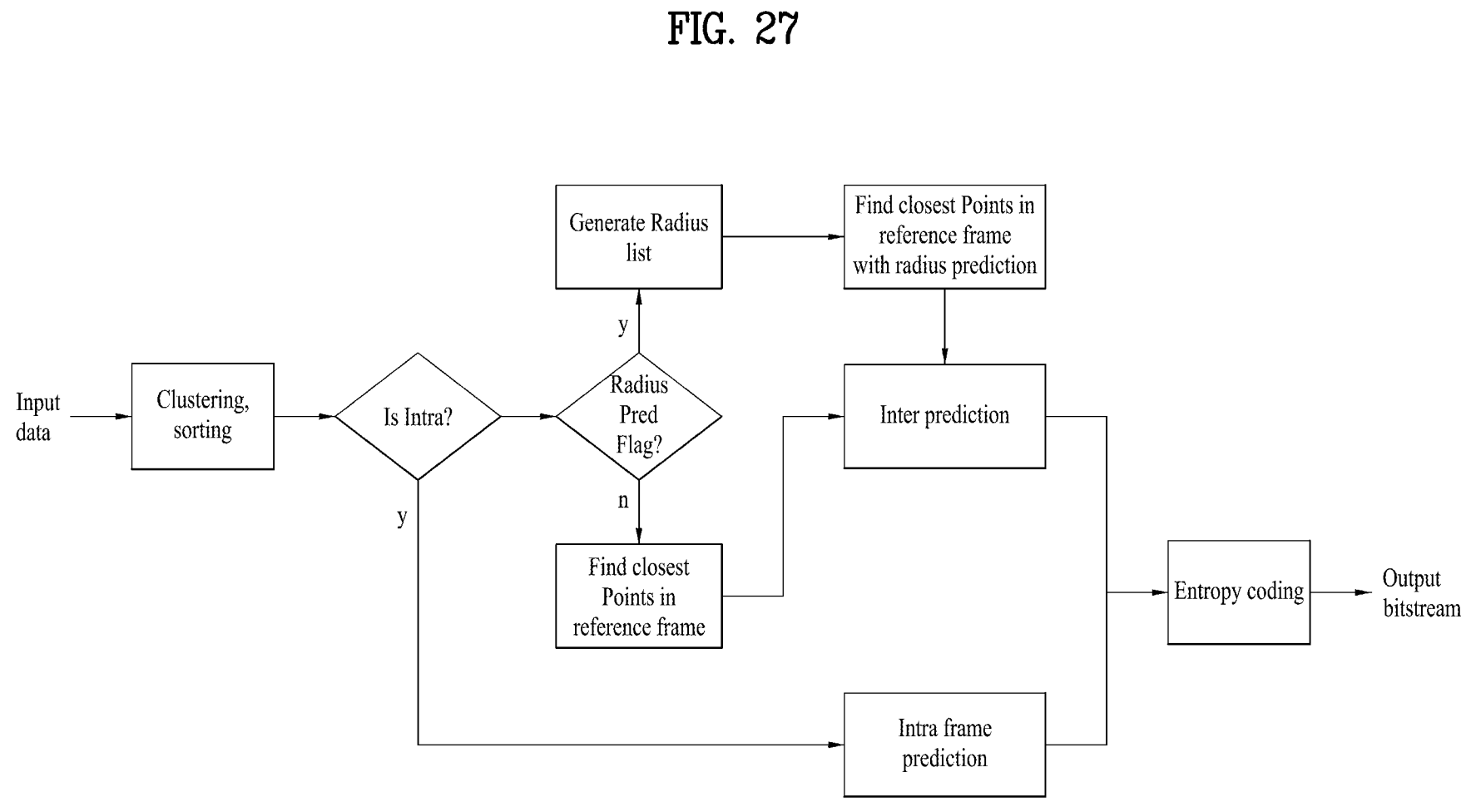

FIG. 27 illustrates a point cloud data transmission device according to embodiments;

DETAILED DESCRIPTION

Reference will now be made in detail to the preferred embodiments of the present disclosure, examples of which are illustrated in the accompanying drawings. The detailed description, which will be given below with reference to the accompanying drawings, is intended to explain exemplary embodiments of the present disclosure, rather than to show the only embodiments that may be implemented according to the present disclosure. The following detailed description includes specific details in order to provide a thorough understanding of the present disclosure. However, it will be apparent to those skilled in the art that the present disclosure may be practiced without such specific details.

Although most terms used in the present disclosure have been selected from general ones widely used in the art, some terms have been arbitrarily selected by the applicant and their meanings are explained in detail in the following description as needed. Thus, the present disclosure should be understood based upon the intended meanings of the terms rather than their simple names or meanings.

Figure 1:
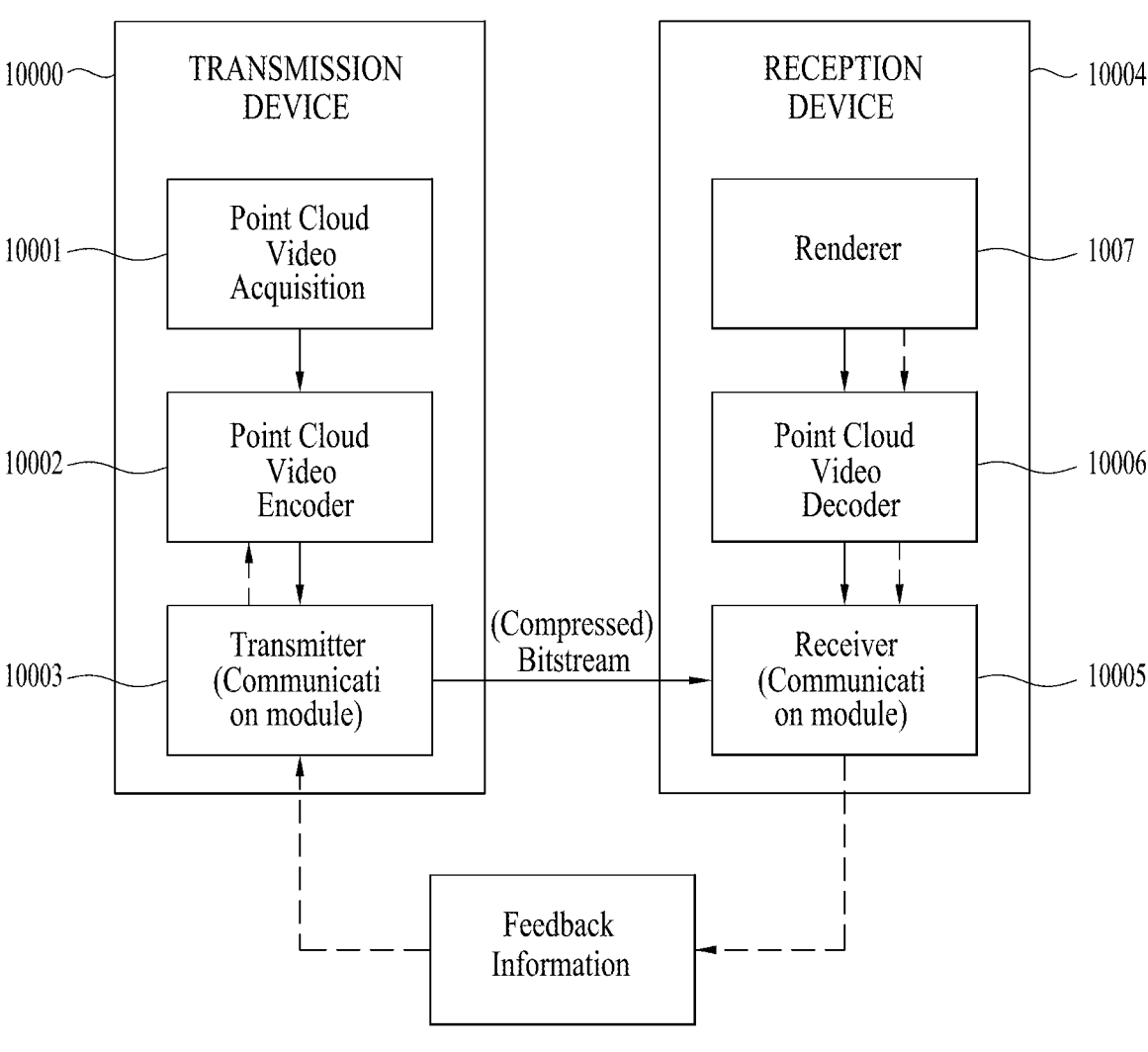
FIG. 1 shows an exemplary point cloud content providing system according to embodiments.

FIG. 1 shows an exemplary point cloud content providing system according to embodiments.

The point cloud content providing system illustrated in FIG. 1 may include a transmission device 10000 and a reception device 10004. The transmission device 10000 and the reception device 10004 are capable of wired or wireless communication to transmit and receive point cloud data.

The point cloud data transmission device 10000 according to the embodiments may secure and process point cloud video (or point cloud content) and transmit the same. According to embodiments, the transmission device 10000 may include a fixed station, a base transceiver system (BTS), a network, an artificial intelligence (AI) device and/or system, a robot, an AR/VR/XR device and/or server. According to embodiments, the transmission device 10000 may include a device, a robot, a vehicle, an AR/VR/XR device, a portable device, a home appliance, an Internet of Thing (IoT) device, and an AI device/server which are configured to perform communication with a base station and/or other wireless devices using a radio access technology (e.g., 5G New RAT (NR), Long Term Evolution (LTE)).

The transmission device 10000 according to the embodiments includes a point cloud video acquirer 10001, a point cloud video encoder 10002, and/or a transmitter (or communication module) 10003.

The point cloud video acquirer 10001 according to the embodiments acquires a point cloud video through a processing process such as capture, synthesis, or generation. The point cloud video is point cloud content represented by a point cloud, which is a set of points positioned in a 3D space, and may be referred to as point cloud video data. The point cloud video according to the embodiments may include one or more frames. One frame represents a still image/picture. Therefore, the point cloud video may include a point cloud image/frame/picture, and may be referred to as a point cloud image, frame, or picture.

The point cloud video encoder 10002 according to the embodiments encodes the acquired point cloud video data. The point cloud video encoder 10002 may encode the point cloud video data based on point cloud compression coding. The point cloud compression coding according to the embodiments may include geometry-based point cloud compression (G-PCC) coding and/or video-based point cloud compression (V-PCC) coding or next-generation coding. The point cloud compression coding according to the embodiments is not limited to the above-described embodiment. The point cloud video encoder 10002 may output a bitstream containing the encoded point cloud video data. The bitstream may contain not only the encoded point cloud video data, but also signaling information related to encoding of the point cloud video data.

The transmitter 10003 according to the embodiments transmits the bitstream containing the encoded point cloud video data. The bitstream according to the embodiments is encapsulated in a file or segment (e.g., a streaming segment), and is transmitted over various networks such as a broadcasting network and/or a broadband network. Although not shown in the figure, the transmission device 10000 may include an encapsulator (or an encapsulation module) configured to perform an encapsulation operation. According to embodiments, the encapsulator may be included in the transmitter 10003. According to embodiments, the file or segment may be transmitted to the reception device 10004 over a network, or stored in a digital storage medium (e.g., USB, SD, CD, DVD, Blu-ray, HDD, SSD, etc.). The transmitter 10003 according to the embodiments is capable of wired/wireless communication with the reception device 10004 (or the receiver 10005) over a network of 4G, 5G, 6G, etc. In addition, the transmitter may perform a necessary data processing operation according to the network system (e.g., a 4G, 5G or 6G communication network system). The transmission device 10000 may transmit the encapsulated data in an on-demand manner.

The reception device 10004 according to the embodiments includes a receiver 10005, a point cloud video decoder 10006, and/or a renderer 10007. According to embodiments, the reception device 10004 may include a device, a robot, a vehicle, an AR/VR/XR device, a portable device, a home appliance, an Internet of Things (IoT) device, and an AI device/server which are configured to perform communication with a base station and/or other wireless devices using a radio access technology (e.g., 5G New RAT (NR), Long Term Evolution (LTE)).

The receiver 10005 according to the embodiments receives the bitstream containing the point cloud video data or the file/segment in which the bitstream is encapsulated from the network or storage medium. The receiver 10005 may perform necessary data processing according to the network system (e.g., a communication network system of 4G, 5G, 6G, etc.). The receiver 10005 according to the embodiments may decapsulate the received file/segment and output a bitstream. According to embodiments, the receiver 10005 may include a decapsulator (or a decapsulation module) configured to perform a decapsulation operation. The decapsulator may be implemented as an element (or component) separate from the receiver 10005.

The point cloud video decoder 10006 decodes the bitstream containing the point cloud video data. The point cloud video decoder 10006 may decode the point cloud video data according to the method by which the point cloud video data is encoded (e.g., in a reverse process of the operation of the point cloud video encoder 10002). Accordingly, the point cloud video decoder 10006 may decode the point cloud video data by performing point cloud decompression coding, which is the reverse process to the point cloud compression. The point cloud decompression coding includes G-PCC coding.

The renderer 10007 renders the decoded point cloud video data. The renderer 10007 may output point cloud content by rendering not only the point cloud video data but also audio data. According to embodiments, the renderer 10007 may include a display configured to display the point cloud content. According to embodiments, the display may be implemented as a separate device or component rather than being included in the renderer 10007.

The arrows indicated by dotted lines in the drawing represent a transmission path of feedback information acquired by the reception device 10004. The feedback information is information for reflecting interactivity with a user who consumes the point cloud content, and includes information about the user (e.g., head orientation information, viewport information, and the like). In particular, when the point cloud content is content for a service (e.g., self-driving service, etc.) that requires interaction with the user, the feedback information may be provided to the content transmitting side (e.g., the transmission device 10000) and/or the service provider. According to embodiments, the feedback information may be used in the reception device 10004 as well as the transmission device 10000, or may not be provided.

The head orientation information according to embodiments is information about the user's head position, orientation, angle, motion, and the like. The reception device 10004 according to the embodiments may calculate the viewport information based on the head orientation information. The viewport information may be information about a region of a point cloud video that the user is viewing. A viewpoint is a point through which the user is viewing the point cloud video, and may refer to a center point of the viewport region. That is, the viewport is a region centered on the viewpoint, and the size and shape of the region may be determined by a field of view (FOV). Accordingly, the reception device 10004 may extract the viewport information based on a vertical or horizontal FOV supported by the device in addition to the head orientation information. Also, the reception device 10004 performs gaze analysis or the like to check the way the user consumes a point cloud, a region that the user gazes at in the point cloud video, a gaze time, and the like. According to embodiments, the reception device 10004 may transmit feedback information including the result of the gaze analysis to the transmission device 10000. The feedback information according to the embodiments may be acquired in the rendering and/or display process. The feedback information according to the embodiments may be secured by one or more sensors included in the reception device 10004. According to embodiments, the feedback information may be secured by the renderer 10007 or a separate external element (or device, component, or the like). The dotted lines in FIG. 1 represent a process of transmitting the feedback information secured by the renderer 10007. The point cloud content providing system may process (encode/decode) point cloud data based on the feedback information. Accordingly, the point cloud video data decoder 10006 may perform a decoding operation based on the feedback information. The reception device 10004 may transmit the feedback information to the transmission device 10000. The transmission device 10000 (or the point cloud video data encoder 10002) may perform an encoding operation based on the feedback information. Accordingly, the point cloud content providing system may efficiently process necessary data (e.g., point cloud data corresponding to the user's head position) based on the feedback information rather than processing (encoding/decoding) the entire point cloud data, and provide point cloud content to the user.

According to embodiments, the transmission device 10000 may be called an encoder, a transmission device, a transmitter, or the like, and the reception device 10004 may be called a decoder, a receiving device, a receiver, or the like.

The point cloud data processed in the point cloud content providing system of FIG. 1 according to embodiments (through a series of processes of acquisition/encoding/transmission/decoding/rendering) may be referred to as point cloud content data or point cloud video data. According to embodiments, the point cloud content data may be used as a concept covering metadata or signaling information related to the point cloud data.

The elements of the point cloud content providing system illustrated in FIG. 1 may be implemented by hardware, software, a processor, and/or a combination thereof.

Figure 2:
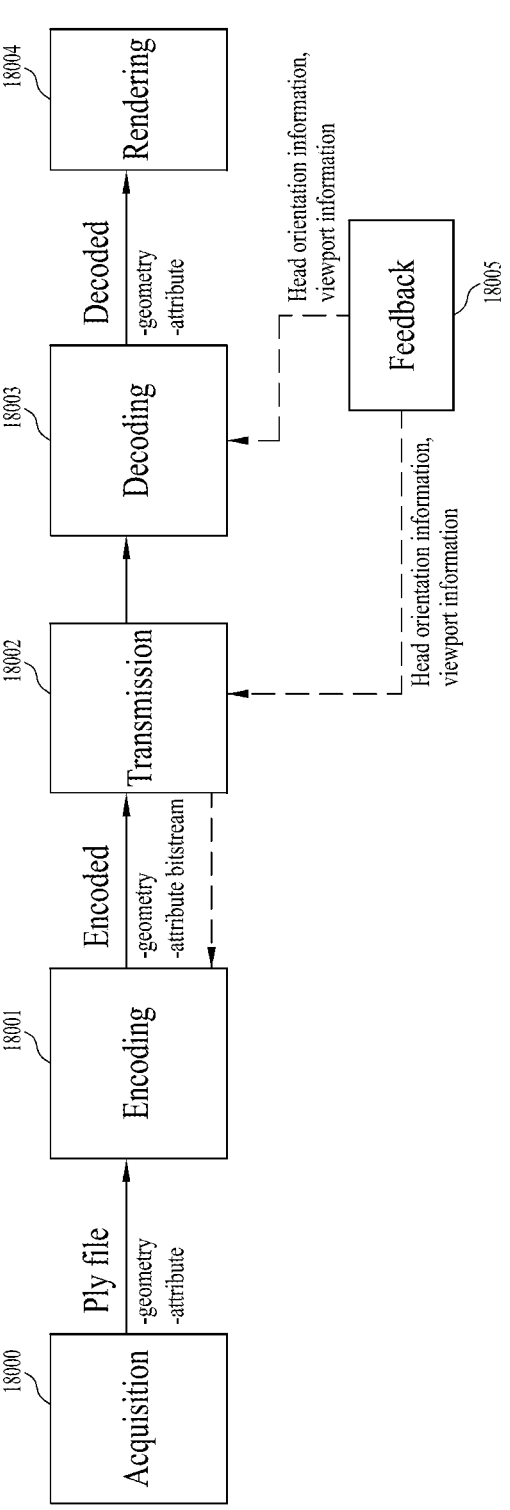
FIG. 2 is a block diagram illustrating a point cloud content providing operation according to embodiments.

FIG. 2 is a block diagram illustrating a point cloud content providing operation according to embodiments.

The block diagram of FIG. 2 shows the operation of the point cloud content providing system described in FIG. 1. As described above, the point cloud content providing system may process point cloud data based on point cloud compression coding (e.g., G-PCC).

The point cloud content providing system according to the embodiments (e.g., the point cloud transmission device 10000 or the point cloud video acquirer 10001) may acquire a point cloud video (20000). The point cloud video is represented by a point cloud belonging to a coordinate system for expressing a 3D space. The point cloud video according to the embodiments may include a Ply (Polygon File format or the Stanford Triangle format) file. When the point cloud video has one or more frames, the acquired point cloud video may include one or more Ply files. The Ply files contain point cloud data, such as point geometry and/or attributes. The geometry includes positions of points. The position of each point may be represented by parameters (e.g., values of the X, Y, and Z axes) representing a three-dimensional coordinate system (e.g., a coordinate system composed of X, Y and Z axes). The attributes include attributes of points (e.g., information about texture, color (in YCbCr or RGB), reflectance r, transparency, etc. of each point). A point has one or more attributes. For example, a point may have an attribute that is a color, or two attributes that are color and reflectance. According to embodiments, the geometry may be called positions, geometry information, geometry data, or the like, and the attribute may be called attributes, attribute information, attribute data, or the like. The point cloud content providing system (e.g., the point cloud transmission device 10000 or the point cloud video acquirer 10001) may secure point cloud data from information (e.g., depth information, color information, etc.) related to the acquisition process of the point cloud video.

The point cloud content providing system (e.g., the transmission device 10000 or the point cloud video encoder 10002) according to the embodiments may encode the point cloud data (20001). The point cloud content providing system may encode the point cloud data based on point cloud compression coding. As described above, the point cloud data may include the geometry and attributes of a point. Accordingly, the point cloud content providing system may perform geometry encoding of encoding the geometry and output a geometry bitstream. The point cloud content providing system may perform attribute encoding of encoding attributes and output an attribute bitstream. According to embodiments, the point cloud content providing system may perform the attribute encoding based on the geometry encoding. The geometry bitstream and the attribute bitstream according to the embodiments may be multiplexed and output as one bitstream. The bitstream according to the embodiments may further contain signaling information related to the geometry encoding and attribute encoding.

The point cloud content providing system (e.g., the transmission device 10000 or the transmitter 10003) according to the embodiments may transmit the encoded point cloud data (20002). As illustrated in FIG. 1, the encoded point cloud data may be represented by a geometry bitstream and an attribute bitstream. In addition, the encoded point cloud data may be transmitted in the form of a bitstream together with signaling information related to encoding of the point cloud data (e.g., signaling information related to the geometry encoding and the attribute encoding). The point cloud content providing system may encapsulate a bitstream that carries the encoded point cloud data and transmit the same in the form of a file or segment.

The point cloud content providing system (e.g., the reception device 10004 or the receiver 10005) according to the embodiments may receive the bitstream containing the encoded point cloud data. In addition, the point cloud content providing system (e.g., the reception device 10004 or the receiver 10005) may demultiplex the bitstream.

The point cloud content providing system (e.g., the reception device 10004 or the point cloud video decoder 10005) may decode the encoded point cloud data (e.g., the geometry bitstream, the attribute bitstream) transmitted in the bitstream. The point cloud content providing system (e.g., the reception device 10004 or the point cloud video decoder 10005) may decode the point cloud video data based on the signaling information related to encoding of the point cloud video data contained in the bitstream. The point cloud content providing system (e.g., the reception device 10004 or the point cloud video decoder 10005) may decode the geometry bitstream to reconstruct the positions (geometry) of points. The point cloud content providing system may reconstruct the attributes of the points by decoding the attribute bitstream based on the reconstructed geometry. The point cloud content providing system (e.g., the reception device 10004 or the point cloud video decoder 10005) may reconstruct the point cloud video based on the positions according to the reconstructed geometry and the decoded attributes.

The point cloud content providing system according to the embodiments (e.g., the reception device 10004 or the renderer 10007) may render the decoded point cloud data (20004). The point cloud content providing system (e.g., the reception device 10004 or the renderer 10007) may render the geometry and attributes decoded through the decoding process, using various rendering methods. Points in the point cloud content may be rendered to a vertex having a certain thickness, a cube having a specific minimum size centered on the corresponding vertex position, or a circle centered on the corresponding vertex position. All or part of the rendered point cloud content is provided to the user through a display (e.g., a VR/AR display, a general display, etc.).

The point cloud content providing system (e.g., the reception device 10004) according to the embodiments may secure feedback information (20005). The point cloud content providing system may encode and/or decode point cloud data based on the feedback information. The feedback information and the operation of the point cloud content providing system according to the embodiments are the same as the feedback information and the operation described with reference to FIG. 1, and thus detailed description thereof is omitted.

Figure 3:
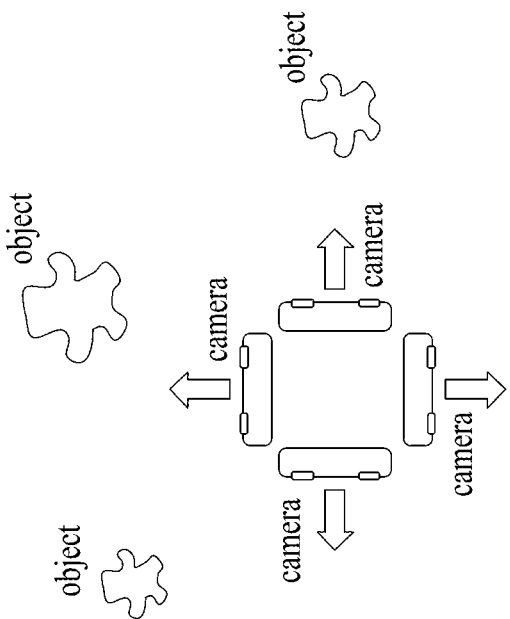
FIG. 3 illustrates an exemplary process of capturing a point cloud video according to embodiments.
Figure 3:
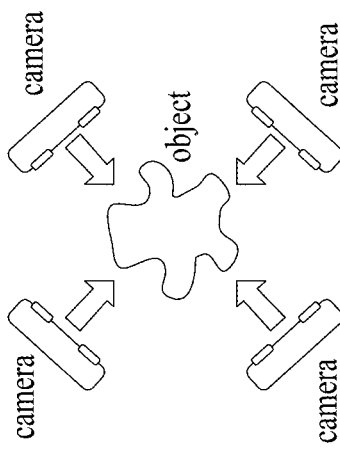

FIG. 3 illustrates an exemplary process of capturing a point cloud video according to embodiments.

FIG. 3 illustrates an exemplary point cloud video capture process of the point cloud content providing system described with reference to FIGS. 1 to 2.

Point cloud content includes a point cloud video (images and/or videos) representing an object and/or environment located in various 3D spaces (e.g., a 3D space representing a real environment, a 3D space representing a virtual environment, etc.). Accordingly, the point cloud content providing system according to the embodiments may capture a point cloud video using one or more cameras (e.g., an infrared camera capable of securing depth information, an RGB camera capable of extracting color information corresponding to the depth information, etc.), a projector (e.g., an infrared pattern projector to secure depth information), a LiDAR, or the like. The point cloud content providing system according to the embodiments may extract the shape of geometry composed of points in a 3D space from the depth information and extract the attributes of each point from the color information to secure point cloud data. An image and/or video according to the embodiments may be captured based on at least one of the inward-facing technique and the outward-facing technique.

The left part of FIG. 3 illustrates the inward-facing technique. The inward-facing technique refers to a technique of capturing images a central object with one or more cameras (or camera sensors) positioned around the central object. The inward-facing technique may be used to generate point cloud content providing a 360-degree image of a key object to the user (e.g., VR/AR content providing a 360-degree image of an object (e.g., a key object such as a character, player, object, or actor) to the user).

The right part of FIG. 3 illustrates the outward-facing technique. The outward-facing technique refers to a technique of capturing images an environment of a central object rather than the central object with one or more cameras (or camera sensors) positioned around the central object. The outward-facing technique may be used to generate point cloud content for providing a surrounding environment that appears from the user's point of view (e.g., content representing an external environment that may be provided to a user of a self-driving vehicle).

As shown in the figure, the point cloud content may be generated based on the capturing operation of one or more cameras. In this case, the coordinate system may differ among the cameras, and accordingly the point cloud content providing system may calibrate one or more cameras to set a global coordinate system before the capturing operation. In addition, the point cloud content providing system may generate point cloud content by synthesizing an arbitrary image and/or video with an image and/or video captured by the above-described capture technique. The point cloud content providing system may not perform the capturing operation described in FIG. 3 when it generates point cloud content representing a virtual space. The point cloud content providing system according to the embodiments may perform post-processing on the captured image and/or video. In other words, the point cloud content providing system may remove an unwanted area (e.g., a background), recognize a space to which the captured images and/or videos are connected, and, when there is a spatial hole, perform an operation of filling the spatial hole.

The point cloud content providing system may generate one piece of point cloud content by performing coordinate transformation on points of the point cloud video secured from each camera. The point cloud content providing system may perform coordinate transformation on the points based on the coordinates of the position of each camera. Accordingly, the point cloud content providing system may generate content representing one wide range, or may generate point cloud content having a high density of points.

Figure 4:
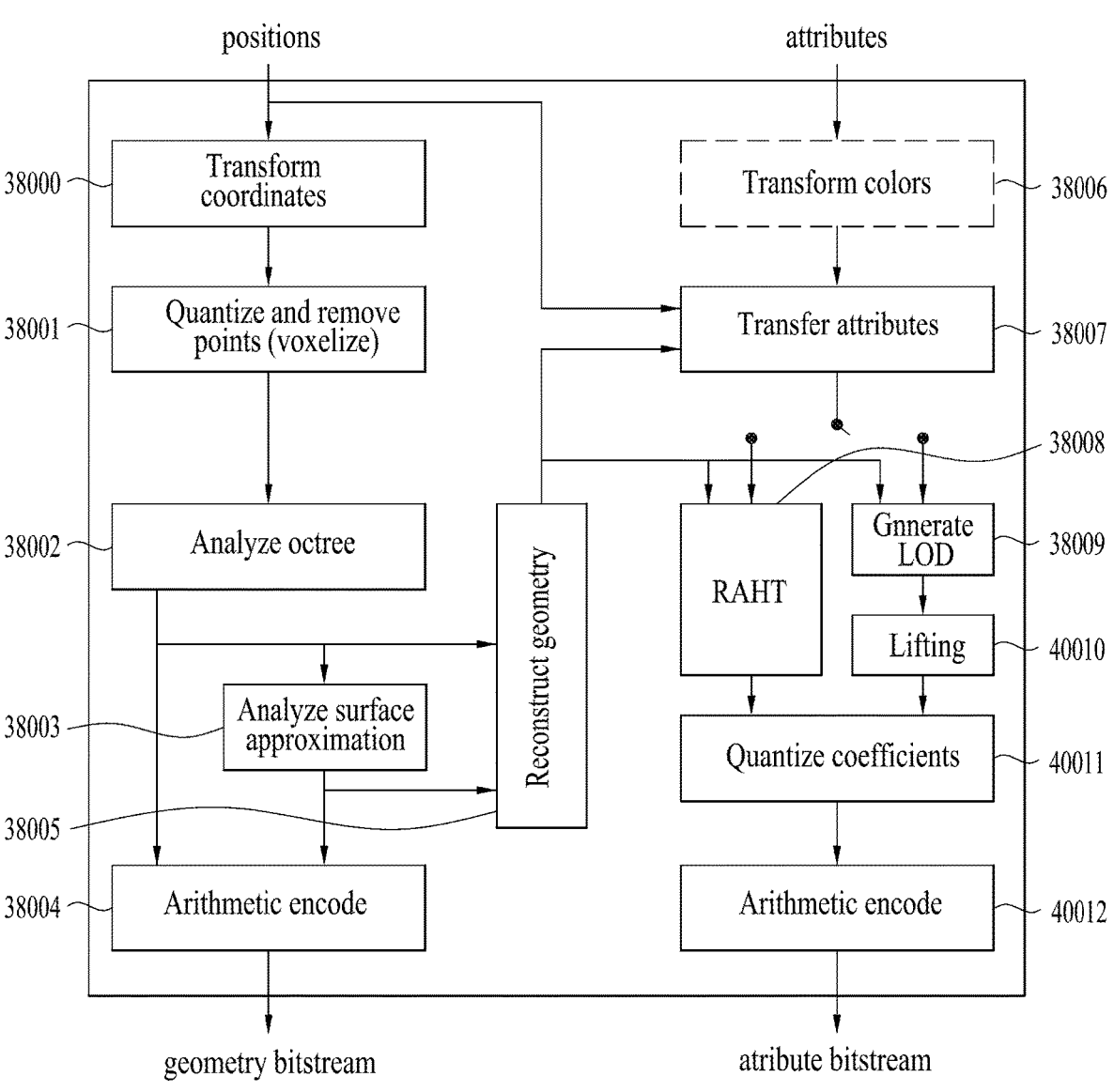
FIG. 4 illustrates an exemplary point cloud encoder according to embodiments.

FIG. 4 illustrates an exemplary point cloud encoder according to embodiments.

FIG. 4 shows an example of the point cloud video encoder 10002 of FIG. 1. The point cloud encoder reconstructs and encodes point cloud data (e.g., positions and/or attributes of the points) to adjust the quality of the point cloud content (to, for example, lossless, lossy, or near-lossless) according to the network condition or applications. When the overall size of the point cloud content is large (e.g., point cloud content of 60 Gbps is given for 30 fps), the point cloud content providing system may fail to stream the content in real time. Accordingly, the point cloud content providing system may reconstruct the point cloud content based on the maximum target bitrate to provide the same in accordance with the network environment or the like.

As described with reference to FIGS. 1 and 2, the point cloud encoder may perform geometry encoding and attribute encoding. The geometry encoding is performed before the attribute encoding.

The point cloud encoder according to the embodiments includes a coordinate transformer (Transform coordinates) 40000, a quantizer (Quantize and remove points (voxelize)) 40001, an octree analyzer (Analyze octree) 40002, and a surface approximation analyzer (Analyze surface approximation) 40003, an arithmetic encoder (Arithmetic encode) 40004, a geometry reconstructor (Reconstruct geometry) 40005, a color transformer (Transform colors) 40006, an attribute transformer (Transform attributes) 40007, a RAHT transformer (RAHT) 40008, an LOD generator (Generate LOD) 40009, a lifting transformer (Lifting) 40010, a coefficient quantizer (Quantize coefficients) 40011, and/or an arithmetic encoder (Arithmetic encode) 40012.

The coordinate transformer 40000, the quantizer 40001, the octree analyzer 40002, the surface approximation analyzer 40003, the arithmetic encoder 40004, and the geometry reconstructor 40005 may perform geometry encoding. The geometry encoding according to the embodiments may include octree geometry coding, direct coding, trisoup geometry encoding, and entropy encoding. The direct coding and trisoup geometry encoding are applied selectively or in combination. The geometry encoding is not limited to the above-described example.

As shown in the figure, the coordinate transformer 40000 according to the embodiments receives positions and transforms the same into coordinates. For example, the positions may be transformed into position information in a three-dimensional space (e.g., a three-dimensional space represented by an XYZ coordinate system). The position information in the three-dimensional space according to the embodiments may be referred to as geometry information.

The quantizer 40001 according to the embodiments quantizes the geometry. For example, the quantizer 40001 may quantize the points based on a minimum position value of all points (e.g., a minimum value on each of the X, Y, and Z axes). The quantizer 40001 performs a quantization operation of multiplying the difference between the minimum position value and the position value of each point by a preset quantization scale value and then finding the nearest integer value by rounding the value obtained through the multiplication. Thus, one or more points may have the same quantized position (or position value). The quantizer 40001 according to the embodiments performs voxelization based on the quantized positions to reconstruct quantized points. As in the case of a pixel, which is the minimum unit containing 2D image/video information, points of point cloud content (or 3D point cloud video) according to the embodiments may be included in one or more voxels. The term voxel, which is a compound of volume and pixel, refers to a 3D cubic space generated when a 3D space is divided into units (unit=1.0) based on the axes representing the 3D space (e.g., X-axis, Y-axis, and Z-axis). The quantizer 40001 may match groups of points in the 3D space with voxels. According to embodiments, one voxel may include only one point. According to embodiments, one voxel may include one or more points. In order to express one voxel as one point, the position of the center of a voxel may be set based on the positions of one or more points included in the voxel. In this case, attributes of all positions included in one voxel may be combined and assigned to the voxel.

The octree analyzer 40002 according to the embodiments performs octree geometry coding (or octree coding) to present voxels in an octree structure. The octree structure represents points matched with voxels, based on the octal tree structure.

The surface approximation analyzer 40003 according to the embodiments may analyze and approximate the octree. The octree analysis and approximation according to the embodiments is a process of analyzing a region containing a plurality of points to efficiently provide octree and voxelization.

The arithmetic encoder 40004 according to the embodiments performs entropy encoding on the octree and/or the approximated octree. For example, the encoding scheme includes arithmetic encoding. As a result of the encoding, a geometry bitstream is generated.

The color transformer 40006, the attribute transformer 40007, the RAHT transformer 40008, the LOD generator 40009, the lifting transformer 40010, the coefficient quantizer 40011, and/or the arithmetic encoder 40012 perform attribute encoding. As described above, one point may have one or more attributes. The attribute encoding according to the embodiments is equally applied to the attributes that one point has. However, when an attribute (e.g., color) includes one or more elements, attribute encoding is independently applied to each element. The attribute encoding according to the embodiments includes color transform coding, attribute transform coding, region adaptive hierarchical transform (RAHT) coding, interpolation-based hierarchical nearest-neighbor prediction (prediction transform) coding, and interpolation-based hierarchical nearest-neighbor prediction with an update/lifting step (lifting transform) coding. Depending on the point cloud content, the RAHT coding, the prediction transform coding and the lifting transform coding described above may be selectively used, or a combination of one or more of the coding schemes may be used. The attribute encoding according to the embodiments is not limited to the above-described example.

The color transformer 40006 according to the embodiments performs color transform coding of transforming color values (or textures) included in the attributes. For example, the color transformer 40006 may transform the format of color information (for example, from RGB to YCbCr). The operation of the color transformer 40006 according to embodiments may be optionally applied according to the color values included in the attributes.

The geometry reconstructor 40005 according to the embodiments reconstructs (decompresses) the octree and/or the approximated octree. The geometry reconstructor 40005 reconstructs the octree/voxels based on the result of analyzing the distribution of points. The reconstructed octree/voxels may be referred to as reconstructed geometry (restored geometry).

The attribute transformer 40007 according to the embodiments performs attribute transformation to transform the attributes based on the reconstructed geometry and/or the positions on which geometry encoding is not performed. As described above, since the attributes are dependent on the geometry, the attribute transformer 40007 may transform the attributes based on the reconstructed geometry information. For example, based on the position value of a point included in a voxel, the attribute transformer 40007 may transform the attribute of the point at the position. As described above, when the position of the center of a voxel is set based on the positions of one or more points included in the voxel, the attribute transformer 40007 transforms the attributes of the one or more points. When the trisoup geometry encoding is performed, the attribute transformer 40007 may transform the attributes based on the trisoup geometry encoding.

The attribute transformer 40007 may perform the attribute transformation by calculating the average of attributes or attribute values of neighboring points (e.g., color or reflectance of each point) within a specific position/radius from the position (or position value) of the center of each voxel. The attribute transformer 40007 may apply a weight according to the distance from the center to each point in calculating the average. Accordingly, each voxel has a position and a calculated attribute (or attribute value).

The attribute transformer 40007 may search for neighboring points existing within a specific position/radius from the position of the center of each voxel based on the K-D tree or the Morton code. The K-D tree is a binary search tree and supports a data structure capable of managing points based on the positions such that nearest neighbor search (NNS) may be performed quickly. The Morton code is generated by presenting coordinates (e.g., (x, y, z)) representing 3D positions of all points as bit values and mixing the bits. For example, when the coordinates representing the position of a point are (5, 9, 1), the bit values for the coordinates are (0101, 1001, 0001). Mixing the bit values according to the bit index in order of z, y, and x yields 010001000111. This value is expressed as a decimal number of 1095. That is, the Morton code value of the point having coordinates (5, 9, 1) is 1095. The attribute transformer 40007 may order the points based on the Morton code values and perform NNS through a depth-first traversal process. After the attribute transformation operation, the K-D tree or the Morton code is used when the NNS is needed in another transformation process for attribute coding.

As shown in the figure, the transformed attributes are input to the RAHT transformer 40008 and/or the LOD generator 40009.

The RAHT transformer 40008 according to the embodiments performs RAHT coding for predicting attribute information based on the reconstructed geometry information. For example, the RAHT transformer 40008 may predict attribute information of a node at a higher level in the octree based on the attribute information associated with a node at a lower level in the octree.

The LOD generator 40009 according to the embodiments generates a level of detail (LOD) to perform prediction transform coding. The LOD according to the embodiments is a degree of detail of point cloud content. As the LOD value decrease, it indicates that the detail of the point cloud content is degraded. As the LOD value increases, it indicates that the detail of the point cloud content is enhanced. Points may be classified by the LOD.

The lifting transformer 40010 according to the embodiments performs lifting transform coding of transforming the attributes a point cloud based on weights. As described above, lifting transform coding may be optionally applied.

The coefficient quantizer 40011 according to the embodiments quantizes the attribute-coded attributes based on coefficients.

The arithmetic encoder 40012 according to the embodiments encodes the quantized attributes based on arithmetic coding.

Although not shown in the figure, the elements of the point cloud encoder of FIG. 4 may be implemented by hardware including one or more processors or integrated circuits configured to communicate with one or more memories included in the point cloud providing device, software, firmware, or a combination thereof. The one or more processors may perform at least one of the operations and/or functions of the elements of the point cloud encoder of FIG. 4 described above. Additionally, the one or more processors may operate or execute a set of software programs and/or instructions for performing the operations and/or functions of the elements of the point cloud encoder of FIG. 4. The one or more memories according to the embodiments may include a high speed random access memory, or include a non-volatile memory (e.g., one or more magnetic disk storage devices, flash memory devices, or other non-volatile solid-state memory devices).

Figure 5:
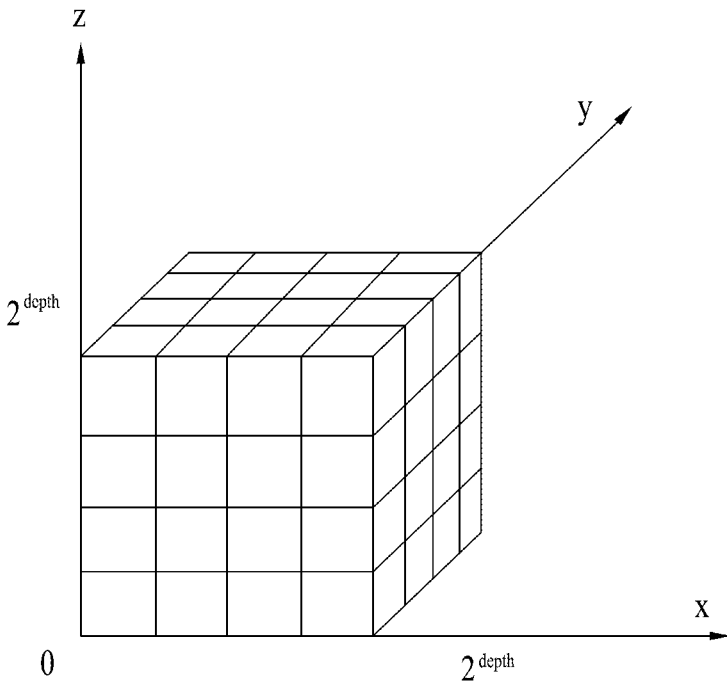
FIG. 5 shows an example of voxels according to embodiments.

FIG. 5 shows an example of voxels according to embodiments.

FIG. 5 shows voxels positioned in a 3D space represented by a coordinate system composed of three axes, which are the X-axis, the Y-axis, and the Z-axis. As described with reference to FIG. 4, the point cloud encoder (e.g., the quantizer 40001) may perform voxelization. Voxel refers to a 3D cubic space generated when a 3D space is divided into units (unit=1.0) based on the axes representing the 3D space (e.g., X-axis, Y-axis, and Z-axis). FIG. 5 shows an example of voxels generated through an octree structure in which a cubical axis-aligned bounding box defined by two poles (0, 0, 0) and ($2^d$, $2^d$, $2^d$) is recursively subdivided. One voxel includes at least one point. The spatial coordinates of a voxel may be estimated from the positional relationship with a voxel group. As described above, a voxel has an attribute (such as color or reflectance) like pixels of a 2D image/video. The details of the voxel are the same as those described with reference to FIG. 4, and therefore a description thereof is omitted.

Figure 6:
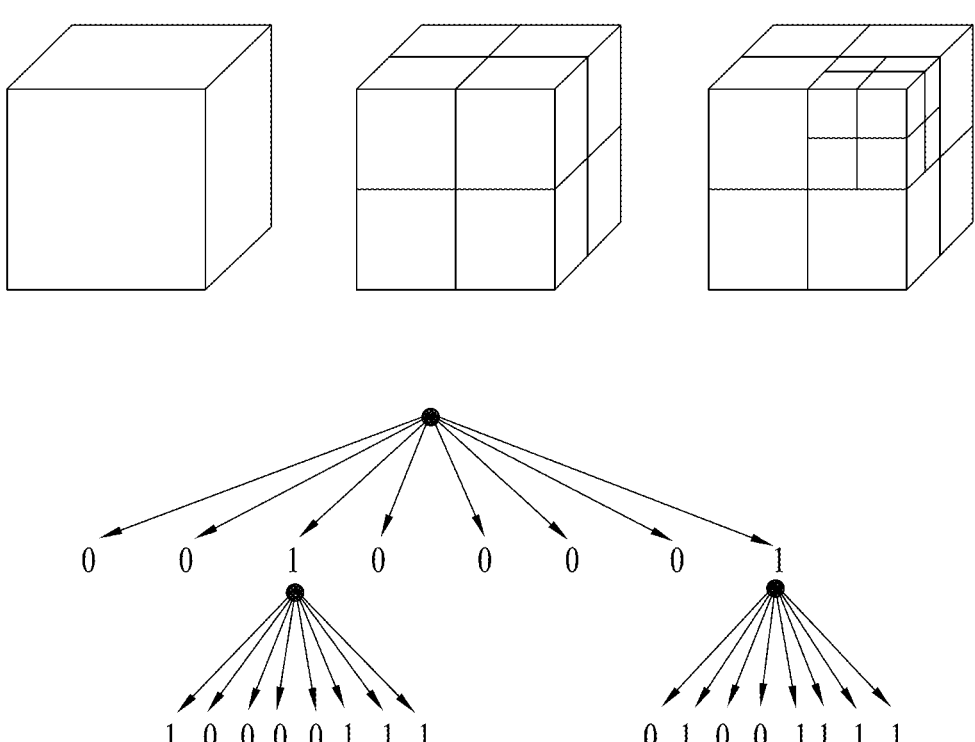
FIG. 6 shows an example of an octree and occupancy code according to embodiments.

FIG. 6 shows an example of an octree and occupancy code according to embodiments.

As described with reference to FIGS. 1 to 4, the point cloud content providing system (point cloud video encoder 10002) or the point cloud encoder (e.g., the octree analyzer 40002) performs octree geometry coding (or octree coding) based on an octree structure to efficiently manage the region and/or position of the voxel.

The upper part of FIG. 6 shows an octree structure. The 3D space of the point cloud content according to the embodiments is represented by axes (e.g., X-axis, Y-axis, and Z-axis) of the coordinate system. The octree structure is created by recursive subdividing of a cubical axis-aligned bounding box defined by two poles (0, 0, 0) and ($2^d$, $2^d$, $2^d$) Here, 2d may be set to a value constituting the smallest bounding box surrounding all points of the point cloud content (or point cloud video). Here, d denotes the depth of the octree. The value of d is determined in the following equation. In the following equation, $(x^{int}_n, y^{int}_n, z^{int}_n)$ denotes the positions (or position values) of quantized points.

$$d = \text{Ceil}\left(\text{Log2}\left(\text{Max}\left(x^{int}_n, y^{int}_n, z^{int}_n, n = 1, \ldots, N\right) + 1\right)\right)$$

As shown in the middle of the upper part of FIG. 6, the entire 3D space may be divided into eight spaces according to partition. Each divided space is represented by a cube with six faces. As shown in the upper right of FIG. 6, each of the eight spaces is divided again based on the axes of the coordinate system (e.g., X-axis, Y-axis, and Z-axis). Accordingly, each space is divided into eight smaller spaces. The divided smaller space is also represented by a cube with six faces. This partitioning scheme is applied until the leaf node of the octree becomes a voxel.

The lower part of FIG. 6 shows an octree occupancy code. The occupancy code of the octree is generated to indicate whether each of the eight divided spaces generated by dividing one space contains at least one point. Accordingly, a single occupancy code is represented by eight child nodes. Each child node represents the occupancy of a divided space, and the child node has a value in 1 bit. Accordingly, the occupancy code is represented as an 8-bit code. That is, when at least one point is contained in the space corresponding to a child node, the node is assigned a value of 1. When no point is contained in the space corresponding to the child node (the space is empty), the node is assigned a value of 0. Since the occupancy code shown in FIG. 6 is 00100001, it indicates that the spaces corresponding to the third child node and the eighth child node among the eight child nodes each contain at least one point. As shown in the figure, each of the third child node and the eighth child node has eight child nodes, and the child nodes are represented by an 8-bit occupancy code. The figure shows that the occupancy code of the third child node is 10000111, and the occupancy code of the eighth child node is 01001111. The point cloud encoder (e.g., the arithmetic encoder 40004) according to the embodiments may perform entropy encoding on the occupancy codes. In order to increase the compression efficiency, the point cloud encoder may perform intra/inter-coding on the occupancy codes. The reception device (e.g., the reception device 10004 or the point cloud video decoder 10006) according to the embodiments reconstructs the octree based on the occupancy codes.

The point cloud encoder (for example, the point cloud encoder of FIG. 4 or the octree analyzer 40002) according to the embodiments may perform voxelization and octree coding to store the positions of points. However, points are not always evenly distributed in the 3D space, and accordingly there may be a specific region in which fewer points are present. Accordingly, it is inefficient to perform voxelization for the entire 3D space. For example, when a specific region contains few points, voxelization does not need to be performed in the specific region.

Accordingly, for the above-described specific region (or a node other than the leaf node of the octree), the point cloud encoder according to the embodiments may skip voxelization and perform direct coding to directly code the positions of points included in the specific region. The coordinates of a direct coding point according to the embodiments are referred to as direct coding mode (DCM). The point cloud encoder according to the embodiments may also perform trisoup geometry encoding, which is to reconstruct the positions of the points in the specific region (or node) based on voxels, based on a surface model. The trisoup geometry encoding is geometry encoding that represents an object as a series of triangular meshes. Accordingly, the point cloud decoder may generate a point cloud from the mesh surface. The direct coding and trisoup geometry encoding according to the embodiments may be selectively performed. In addition, the direct coding and trisoup geometry encoding according to the embodiments may be performed in combination with octree geometry coding (or octree coding).

To perform direct coding, the option to use the direct mode for applying direct coding should be activated. A node to which direct coding is to be applied is not a leaf node, and points less than a threshold should be present within a specific node. In addition, the total number of points to which direct coding is to be applied should not exceed a preset threshold. When the conditions above are satisfied, the point cloud encoder (or the arithmetic encoder 40004) according to the embodiments may perform entropy coding on the positions (or position values) of the points.

The point cloud encoder (e.g., the surface approximation analyzer 40003) according to the embodiments may determine a specific level of the octree (a level less than the depth d of the octree), and the surface model may be used staring with that level to perform trisoup geometry encoding to reconstruct the positions of points in the region of the node based on voxels (Trisoup mode). The point cloud encoder according to the embodiments may specify a level at which trisoup geometry encoding is to be applied. E.g., when the specific level is equal to the depth of the octree, the point cloud encoder does not operate in the trisoup mode. In other words, the point cloud encoder according to the embodiments may operate in the trisoup mode only when the specified level is less than the value of depth of the octree. The 3D cube region of the nodes at the specified level according to the embodiments is called a block. One block may include one or more voxels. The block or voxel may correspond to a brick. Geometry is represented as a surface within each block. The surface according to embodiments may intersect with each edge of a block at most once.

One block has 12 edges, and accordingly there are at least 12 intersections in one block. Each intersection is called a vertex (or apex). A vertex present along an edge is detected when there is at least one occupied voxel adjacent to the edge among all blocks sharing the edge. The occupied voxel according to the embodiments refers to a voxel containing a point. The position of the vertex detected along the edge is the average position along the edge of all voxels adjacent to the edge among all blocks sharing the edge.

Once the vertex is detected, the point cloud encoder according to the embodiments may perform entropy encoding on the starting point (x, y, z) of the edge, the direction vector $(\Delta x, \Delta y, \Delta z)$ of the edge, and the vertex position value (relative position value within the edge). When the trisoup geometry encoding is applied, the point cloud encoder according to the embodiments (e.g., the geometry reconstructor 40005) may generate restored geometry (reconstructed geometry) by performing the triangle reconstruction, up-sampling, and voxelization processes.

The vertices positioned at the edge of the block determine a surface that passes through the block. The surface according to the embodiments is a non-planar polygon. In the triangle reconstruction process, a surface represented by a triangle is reconstructed based on the starting point of the edge, the direction vector of the edge, and the position values of the vertices. The triangle reconstruction process is performed by: i) calculating the centroid value of each vertex, ii) subtracting the center value from each vertex value, and iii) estimating the sum of the squares of the values obtained by the subtraction.

$$\begin{bmatrix} \mu_x \\ \mu_y \\ \mu_z \end{bmatrix} = \frac{1}{n} \sum_{i=1}^{n} \begin{bmatrix} x_i \\ y_i \\ z_i \end{bmatrix}; \qquad \text{i)}$$

$$\begin{bmatrix} \bar{x}_i \\ \bar{y}_i \\ \bar{z}_i \end{bmatrix} = \begin{bmatrix} x_i \\ y_i \\ z_i \end{bmatrix} - \begin{bmatrix} \mu_x \\ \mu_y \\ \mu_z \end{bmatrix}; \qquad \text{ii)}$$

$$\begin{bmatrix} \sigma_x^2 \\ \sigma_y^2 \\ \sigma_z^2 \end{bmatrix} = \sum_{i=1}^{n} \begin{bmatrix} \bar{x}_i^2 \\ \bar{y}_i^2 \\ \bar{z}_i^2 \end{bmatrix} \qquad \text{iii)}$$

The minimum value of the sum is estimated, and the projection process is performed according to the axis with the minimum value. For example, when the element x is the minimum, each vertex is projected on the x-axis with respect to the center of the block, and projected on the (y, z) plane. When the values obtained through projection on the (y, z) plane are (ai, bi), the value of θ is estimated through a tan 2(bi, ai), and the vertices are ordered based on the value of θ. The table below shows a combination of vertices for creating a triangle according to the number of the vertices. The vertices are ordered from 1 to n. The table below shows that for four vertices, two triangles may be constructed according to combinations of vertices. The first triangle may consist of vertices 1, 2, and 3 among the ordered vertices, and the second triangle may consist of vertices 3, 4, and 1 among the ordered vertices.

TABLE 2-1

| Triangles formed from vertices ordered 1, . . . , n |
| --- |
| n triangles |
| 3 (1, 2, 3) |
| 4 (1, 2, 3), (3, 4, 1) |
| 5 (1, 2, 3), (3, 4, 5), (5, 1, 3) |
| 6 (1, 2, 3), (3, 4, 5), (5, 6, 1), (1, 3, 5) |
| 7 (1, 2, 3), (3, 4, 5), (5, 6, 7), (7, 1, 3), (3, 5, 7) |
| 8 (1, 2, 3), (3, 4, 5), (5, 6, 7), (7, 8, 1), (1, 3, 5), (5, 7, 1) |
| 9 (1, 2, 3), (3, 4, 5), (5, 6, 7), (7, 8, 9), (9, 1, 3), (3, 5, 7), (7, 9, 3) |
| 10 (1, 2, 3), (3, 4, 5), (5, 6, 7), (7, 8, 9), (9, 10, 1), (1, 3, 5), (5, 7, 9), (9, 1, 5) |
| 11 (1, 2, 3), (3, 4, 5), (5, 6, 7), (7, 8, 9), (9, 10, 11), (11, 1, 3), (3, 5, 7), (7, 9, 11), (11, 3, 7) |
| 12 (1, 2, 3), (3, 4, 5), (5, 6, 7), (7, 8, 9), (9, 10, 11), (11, 12, 1), (1, 3, 5), (5, 7, 9), (9, 11, 1), (1, 5, 9) |

The upsampling process is performed to add points in the middle along the edge of the triangle and perform voxelization. The added points are generated based on the upsampling factor and the width of the block. The added points are called refined vertices. The point cloud encoder according to the embodiments may voxelize the refined vertices. In addition, the point cloud encoder may perform attribute encoding based on the voxelized positions (or position values).

Figure 7:
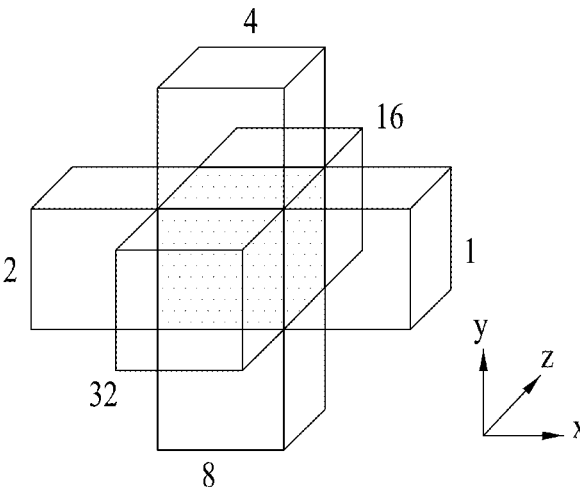
FIG. 7 shows an example of a neighbor node pattern according to embodiments.
Figure 7:
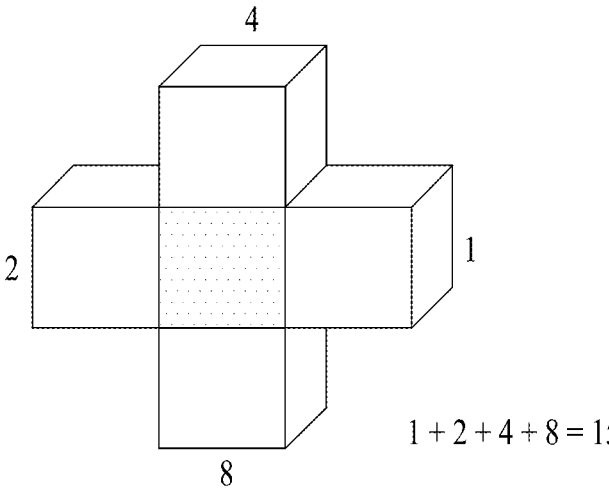

FIG. 7 shows an example of a neighbor node pattern according to embodiments.

In order to increase the compression efficiency of the point cloud video, the point cloud encoder according to the embodiments may perform entropy coding based on context adaptive arithmetic coding.

As described with reference to FIGS. 1 to 6, the point cloud content providing system or the point cloud encoder (for example, the point cloud video encoder 10002, the point cloud encoder or arithmetic encoder 40004 of FIG. 4) may perform entropy coding on the occupancy code immediately. In addition, the point cloud content providing system or the point cloud encoder may perform entropy encoding (intra encoding) based on the occupancy code of the current node and the occupancy of neighboring nodes, or perform entropy encoding (inter encoding) based on the occupancy code of the previous frame. A frame according to embodiments represents a set of point cloud videos generated at the same time. The compression efficiency of intra encoding/inter encoding according to the embodiments may depend on the number of neighboring nodes that are referenced. When the bits increase, the operation becomes complicated, but the encoding may be biased to one side, which may increase the compression efficiency. For example, when a 3-bit context is given, coding needs to be performed using 23=8 methods. The part divided for coding affects the complexity of implementation. Accordingly, it is necessary to meet an appropriate level of compression efficiency and complexity.

FIG. 7 illustrates a process of obtaining an occupancy pattern based on the occupancy of neighbor nodes. The point cloud encoder according to the embodiments determines occupancy of neighbor nodes of each node of the octree and obtains a value of a neighbor pattern. The neighbor node pattern is used to infer the occupancy pattern of the node. The left part of FIG. 7 shows a cube corresponding to a node (a cube positioned in the middle) and six cubes (neighbor nodes) sharing at least one face with the cube. The nodes shown in the figure are nodes of the same depth. The numbers shown in the figure represent weights (1, 2, 4, 8, 16, and 32) associated with the six nodes, respectively. The weights are assigned sequentially according to the positions of neighboring nodes.

The right part of FIG. 7 shows neighbor node pattern values. A neighbor node pattern value is the sum of values multiplied by the weight of an occupied neighbor node (a neighbor node having a point). Accordingly, the neighbor node pattern values are 0 to 63. When the neighbor node pattern value is 0, it indicates that there is no node having a point (no occupied node) among the neighbor nodes of the node. When the neighbor node pattern value is 63, it indicates that all neighbor nodes are occupied nodes. As shown in the figure, since neighbor nodes to which weights 1, 2, 4, and 8 are assigned are occupied nodes, the neighbor node pattern value is 15, the sum of 1, 2, 4, and 8. The point cloud encoder may perform coding according to the neighbor node pattern value (for example, when the neighbor node pattern value is 63, 64 kinds of coding may be performed). According to embodiments, the point cloud encoder may reduce coding complexity by changing a neighbor node pattern value (for example, based on a table by which 64 is changed to 10 or 6).

Figure 8:
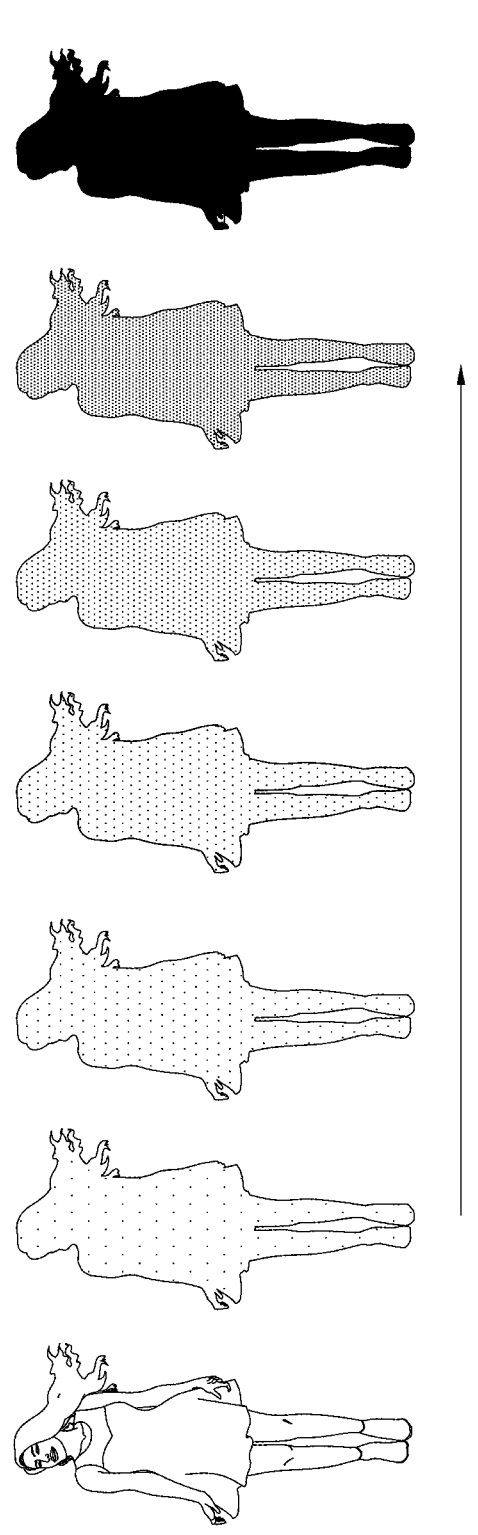
FIG. 8 illustrates an example of point configuration in each LOD according to embodiments.

FIG. 8 illustrates an example of point configuration in each LOD according to embodiments.

As described with reference to FIGS. 1 to 7, encoded geometry is reconstructed (decompressed) before attribute encoding is performed. When direct coding is applied, the geometry reconstruction operation may include changing the placement of direct coded points (e.g., placing the direct coded points in front of the point cloud data). When trisoup geometry encoding is applied, the geometry reconstruction process is performed through triangle reconstruction, up-sampling, and voxelization. Since the attribute depends on the geometry, attribute encoding is performed based on the reconstructed geometry.

The point cloud encoder (e.g., the LOD generator 40009) may classify (reorganize) points by LOD. The figure shows the point cloud content corresponding to LODs. The left-most picture in the figure represents original point cloud content. The second picture from the left of the figure represents distribution of the points in the lowest LOD, and the rightmost picture in the figure represents distribution of the points in the highest LOD. That is, the points in the lowest LOD are sparsely distributed, and the points in the highest LOD are densely distributed. That is, as the LOD rises in the direction pointed by the arrow indicated at the bottom of the figure, the space (or distance) between points is narrowed.

Figure 9:
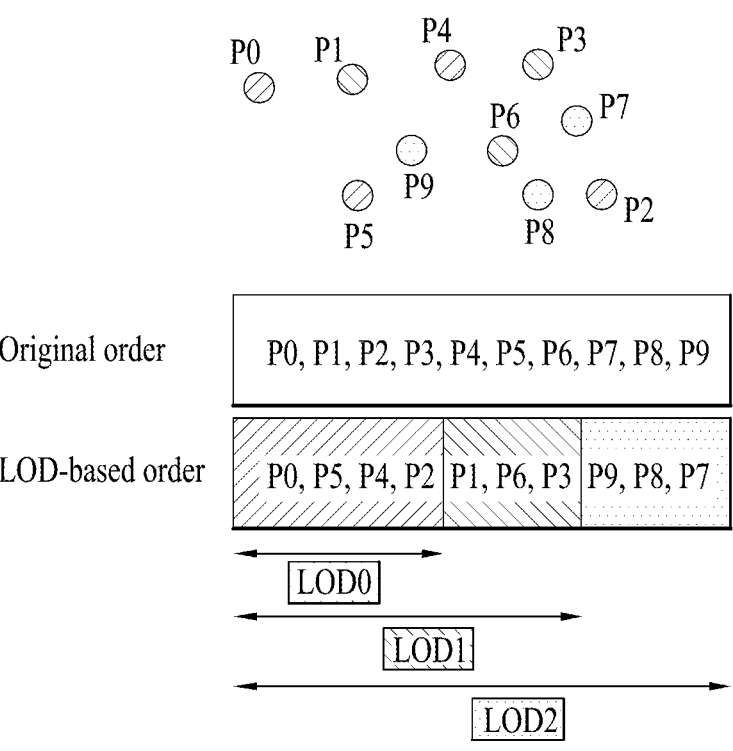
FIG. 9 illustrates an example of point configuration in each LOD according to embodiments.

FIG. 9 illustrates an example of point configuration for each LOD according to embodiments.

As described with reference to FIGS. 1 to 8, the point cloud content providing system, or the point cloud encoder (e.g., the point cloud video encoder 10002, the point cloud encoder of FIG. 4, or the LOD generator 40009) may generates an LOD. The LOD is generated by reorganizing the points into a set of refinement levels according to a set LOD distance value (or a set of Euclidean distances). The LOD generation process is performed not only by the point cloud encoder, but also by the point cloud decoder.

The upper part of FIG. 9 shows examples (P0 to P9) of points of the point cloud content distributed in a 3D space. In FIG. 9, the original order represents the order of points P0 to P9 before LOD generation. In FIG. 9, the LOD based order represents the order of points according to the LOD generation. Points are reorganized by LOD. Also, a high LOD contains the points belonging to lower LODs. As shown in FIG. 9, LOD0 contains P0, P5, P4 and P2. LOD1 contains the points of LOD0, P1, P6 and P3. LOD2 contains the points of LOD0, the points of LOD1, P9, P8 and P7.

As described with reference to FIG. 4, the point cloud encoder according to the embodiments may perform prediction transform coding, lifting transform coding, and RAHT transform coding selectively or in combination.

The point cloud encoder according to the embodiments may generate a predictor for points to perform prediction transform coding for setting a predicted attribute (or predicted attribute value) of each point. That is, N predictors may be generated for N points. The predictor according to the embodiments may calculate a weight (=1/distance) based on the LOD value of each point, indexing information about neighboring points present within a set distance for each LOD, and a distance to the neighboring points.

The predicted attribute (or attribute value) according to the embodiments is set to the average of values obtained by multiplying the attributes (or attribute values) (e.g., color, reflectance, etc.) of neighbor points set in the predictor of each point by a weight (or weight value) calculated based on the distance to each neighbor point. The point cloud encoder according to the embodiments (e.g., the coefficient quantizer 40011) may quantize and inversely quantize the residuals (which may be called residual attributes, residual attribute values, or attribute prediction residuals) obtained by subtracting a predicted attribute (attribute value) from the attribute (attribute value) of each point. The quantization process is configured as shown in the following table.

TABLE Attribute prediction residuals quantization pseudo code

```
int PCCQuantization(int value, int quantStep) {
  if( value >=0) {
    return floor(value / quantStep + 1.0 / 3.0);
  } else {
```

-continued

```
    return −floor(−value / quantStep + 1.0 / 3.0);
  }
}
```

TABLE Attribute prediction residuals inverse quantization pseudo code

```
int PCCInverseQuantization(int value, int quantStep) {
  if( quantStep ==0) {
    return value;
  } else {
    return value * quantStep;
  }
}
```

When the predictor of each point has neighbor points, the point cloud encoder (e.g., the arithmetic encoder 40012) according to the embodiments may perform entropy coding on the quantized and inversely quantized residual values as described above. When the predictor of each point has no neighbor point, the point cloud encoder according to the embodiments (e.g., the arithmetic encoder 40012) may perform entropy coding on the attributes of the corresponding point without performing the above-described operation.

The point cloud encoder according to the embodiments (e.g., the lifting transformer 40010) may generate a predictor of each point, set the calculated LOD and register neighbor points in the predictor, and set weights according to the distances to neighbor points to perform lifting transform coding. The lifting transform coding according to the embodiments is similar to the above-described prediction transform coding, but differs therefrom in that weights are cumulatively applied to attribute values. The process of cumulatively applying weights to the attribute values according to embodiments is configured as follows.

1) Create an array Quantization Weight (QW) for storing the weight value of each point. The initial value of all elements of QW is 1.0. Multiply the QW values of the predictor indexes of the neighbor nodes registered in the predictor by the weight of the predictor of the current point, and add the values obtained by the multiplication.

2) Lift prediction process: Subtract the value obtained by multiplying the attribute value of the point by the weight from the existing attribute value to calculate a predicted attribute value.

3) Create temporary arrays called updateweight and update and initialize the temporary arrays to zero.

4) Cumulatively add the weights calculated by multiplying the weights calculated for all predictors by a weight stored in the QW corresponding to a predictor index to the updateweight array as indexes of neighbor nodes. Cumulatively add, to the update array, a value obtained by multiplying the attribute value of the index of a neighbor node by the calculated weight.

5) Lift update process: Divide the attribute values of the update array for all predictors by the weight value of the updateweight array of the predictor index, and add the existing attribute value to the values obtained by the division.

6) Calculate predicted attributes by multiplying the attribute values updated through the lift update process by the weight updated through the lift prediction process (stored in the QW) for all predictors. The point cloud encoder (e.g., coefficient quantizer 40011) according to the embodiments quantizes the predicted attribute values. In addition, the point cloud encoder (e.g., the arithmetic encoder 40012) performs entropy coding on the quantized attribute values.

The point cloud encoder (e.g., the RAHT transformer 40008) according to the embodiments may perform RAHT transform coding in which attributes of nodes of a higher level are predicted using the attributes associated with nodes of a lower level in the octree. RAHT transform coding is an example of attribute intra coding through an octree backward scan. The point cloud encoder according to the embodiments scans the entire region from the voxel and repeats the merging process of merging the voxels into a larger block at each step until the root node is reached. The merging process according to the embodiments is performed only on the occupied nodes. The merging process is not performed on the empty node. The merging process is performed on an upper node immediately above the empty node.

The equation below represents a RAHT transformation matrix. In the equation, $g_{l_{x,y,z}}$ denotes the average attribute value of voxels at level l. $g_{l_{x,y,z}}$ may be calculated based on $g_{l+1_{2x,y,z}}$ and $g_{l+1_{2x+1,y,z}}$. The weights for $g_{l_{2x,y,z}}$ and $g_{l_{2x+1,y,z}}$ are $w1 = w_{l_{2x,y,z}}$ and $w2 = w_{l_{2x+1,y,z}}$.

$$\begin{bmatrix} g_{l-1_{x,y,z}} \\ h_{l-1_{x,y,z}} \end{bmatrix} = T_{w1w2} \begin{bmatrix} g_{l_{2x,y,z}} \\ g_{l_{2x+1,y,z}} \end{bmatrix}, \; T_{w1w2} = \frac{1}{\sqrt{w1+w2}} \begin{bmatrix} \sqrt{w1} & \sqrt{w2} \\ -\sqrt{w2} & \sqrt{w1} \end{bmatrix}$$

Here, $g_{l-1_{x,y,z}}$ is a low-pass value and is used in the merging process at the next higher level. $h_{l-1_{x,y,z}}$ denotes high-pass coefficients. The high-pass coefficients at each step are quantized and subjected to entropy coding (for example, encoding by the arithmetic encoder 400012). The weights are calculated as $w_{l-1_{x,y,z}} = w_{l_{2x,y,z}} + w_{l_{2x+1,y,z}}$. The root node is created through the $g_{1_{0,0,0}}$ and $g_{1_{0,0,1}}$ as follows.

$$\begin{bmatrix} gDC \\ h_{0_{0,0,0}} \end{bmatrix} = T_{w1000w1001} \begin{bmatrix} g_{1_{0,0,0z}} \\ g_{1_{0,0,1}} \end{bmatrix}$$

Figure 10:
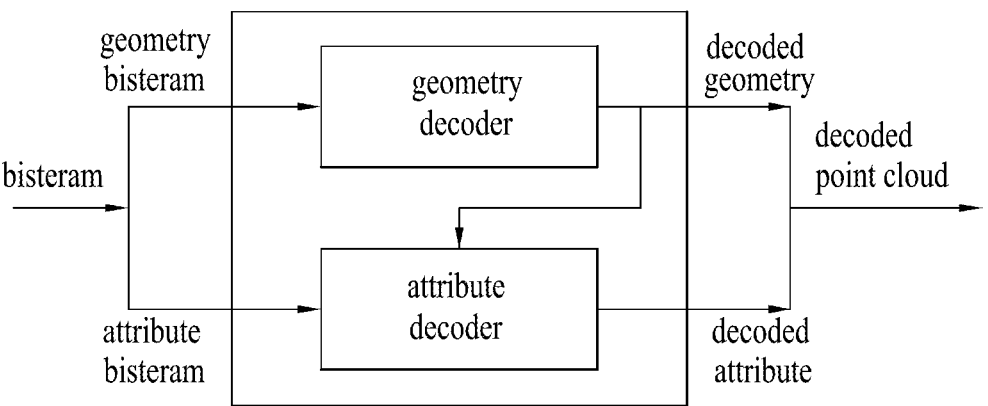
FIG. 10 illustrates a point cloud decoder according to embodiments.

FIG. 10 illustrates a point cloud decoder according to embodiments.

The point cloud decoder illustrated in FIG. 10 is an example of the point cloud video decoder 10006 described in FIG. 1, and may perform the same or similar operations as the operations of the point cloud video decoder 10006 illustrated in FIG. 1. As shown in the figure, the point cloud decoder may receive a geometry bitstream and an attribute bitstream contained in one or more bitstreams. The point cloud decoder includes a geometry decoder and an attribute decoder. The geometry decoder performs geometry decoding on the geometry bitstream and outputs decoded geometry. The attribute decoder performs attribute decoding based on the decoded geometry and the attribute bitstream, and outputs decoded attributes. The decoded geometry and decoded attributes are used to reconstruct point cloud content (a decoded point cloud).

Figure 11:
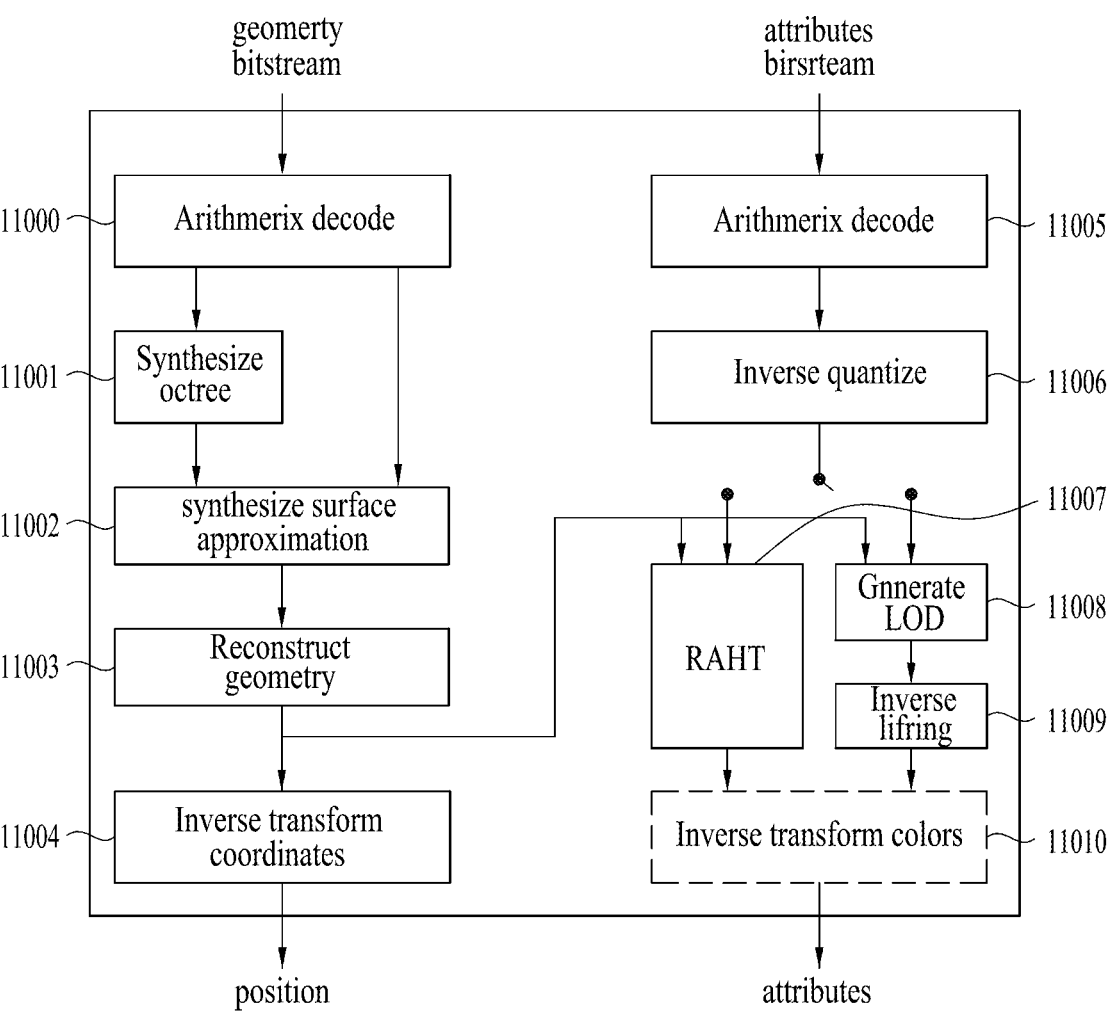
FIG. 11 illustrates a point cloud decoder according to embodiments.

FIG. 11 illustrates a point cloud decoder according to embodiments.

The point cloud decoder illustrated in FIG. 11 is an example of the point cloud decoder illustrated in FIG. 10, and may perform a decoding operation, which is a reverse process to the encoding operation of the point cloud encoder illustrated in FIGS. 1 to 9.

As described with reference to FIGS. 1 and 10, the point cloud decoder may perform geometry decoding and attribute decoding. The geometry decoding is performed before the attribute decoding.

The point cloud decoder according to the embodiments includes an arithmetic decoder (Arithmetic decode) 11000, an octree synthesizer (Synthesize octree) 11001, a surface approximation synthesizer (Synthesize surface approximation) 11002, and a geometry reconstructor (Reconstruct geometry) 11003, a coordinate inverse transformer (Inverse transform coordinates) 11004, an arithmetic decoder (Arithmetic decode) 11005, an inverse quantizer (Inverse quantize) 11006, a RAHT transformer 11007, an LOD generator (Generate LOD) 11008, an inverse lifter (inverse lifting) 11009, and/or a color inverse transformer (Inverse transform colors) 11010.

The arithmetic decoder 11000, the octree synthesizer 11001, the surface approximation synthesizer 11002, and the geometry reconstructor 11003, and the coordinate inverse transformer 11004 may perform geometry decoding. The geometry decoding according to the embodiments may include direct coding and trisoup geometry decoding. The direct coding and trisoup geometry decoding are selectively applied. The geometry decoding is not limited to the above-described example, and is performed as a reverse process to the geometry encoding described with reference to FIGS. 1 to 9.

The arithmetic decoder 11000 according to the embodiments decodes the received geometry bitstream based on the arithmetic coding. The operation of the arithmetic decoder 11000 corresponds to the reverse process to the arithmetic encoder 40004.

The octree synthesizer 11001 according to the embodiments may generate an octree by acquiring an occupancy code from the decoded geometry bitstream (or information on the geometry secured as a result of decoding). The occupancy code is configured as described in detail with reference to FIGS. 1 to 9.

When the trisoup geometry encoding is applied, the surface approximation synthesizer 11002 according to the embodiments may synthesize a surface based on the decoded geometry and/or the generated octree.

The geometry reconstructor 11003 according to the embodiments may regenerate geometry based on the surface and/or the decoded geometry. As described with reference to FIGS. 1 to 9, direct coding and trisoup geometry encoding are selectively applied. Accordingly, the geometry reconstructor 11003 directly imports and adds position information about the points to which direct coding is applied. When the trisoup geometry encoding is applied, the geometry reconstructor 11003 may reconstruct the geometry by performing the reconstruction operations of the geometry reconstructor 40005, for example, triangle reconstruction, up-sampling, and voxelization. Details are the same as those described with reference to FIG. 6, and thus description thereof is omitted. The reconstructed geometry may include a point cloud picture or frame that does not contain attributes.

The coordinate inverse transformer 11004 according to the embodiments may acquire positions of the points by transforming the coordinates based on the reconstructed geometry.

The arithmetic decoder 11005, the inverse quantizer 11006, the RAHT transformer 11007, the LOD generator 11008, the inverse lifter 11009, and/or the color inverse transformer 11010 may perform the attribute decoding described with reference to FIG. 10. The attribute decoding according to the embodiments includes region adaptive hierarchical transform (RAHT) decoding, interpolation-based hierarchical nearest-neighbor prediction (prediction transform) decoding, and interpolation-based hierarchical nearest-neighbor prediction with an update/lifting step (lifting transform) decoding. The three decoding schemes described above may be used selectively, or a combination of one or more decoding schemes may be used. The attribute decoding according to the embodiments is not limited to the above-described example.

The arithmetic decoder 11005 according to the embodiments decodes the attribute bitstream by arithmetic coding.

The inverse quantizer 11006 according to the embodiments inversely quantizes the information about the decoded attribute bitstream or attributes secured as a result of the decoding, and outputs the inversely quantized attributes (or attribute values). The inverse quantization may be selectively applied based on the attribute encoding of the point cloud encoder.

According to embodiments, the RAHT transformer 11007, the LOD generator 11008, and/or the inverse lifter 11009 may process the reconstructed geometry and the inversely quantized attributes. As described above, the RAHT transformer 11007, the LOD generator 11008, and/or the inverse lifter 11009 may selectively perform a decoding operation corresponding to the encoding of the point cloud encoder.

The color inverse transformer 11010 according to the embodiments performs inverse transform coding to inversely transform a color value (or texture) included in the decoded attributes. The operation of the color inverse transformer 11010 may be selectively performed based on the operation of the color transformer 40006 of the point cloud encoder.

Although not shown in the figure, the elements of the point cloud decoder of FIG. 11 may be implemented by hardware including one or more processors or integrated circuits configured to communicate with one or more memories included in the point cloud providing device, software, firmware, or a combination thereof. The one or more processors may perform at least one or more of the operations and/or functions of the elements of the point cloud decoder of FIG. 11 described above. Additionally, the one or more processors may operate or execute a set of software programs and/or instructions for performing the operations and/or functions of the elements of the point cloud decoder of FIG. 11.

Figure 12:
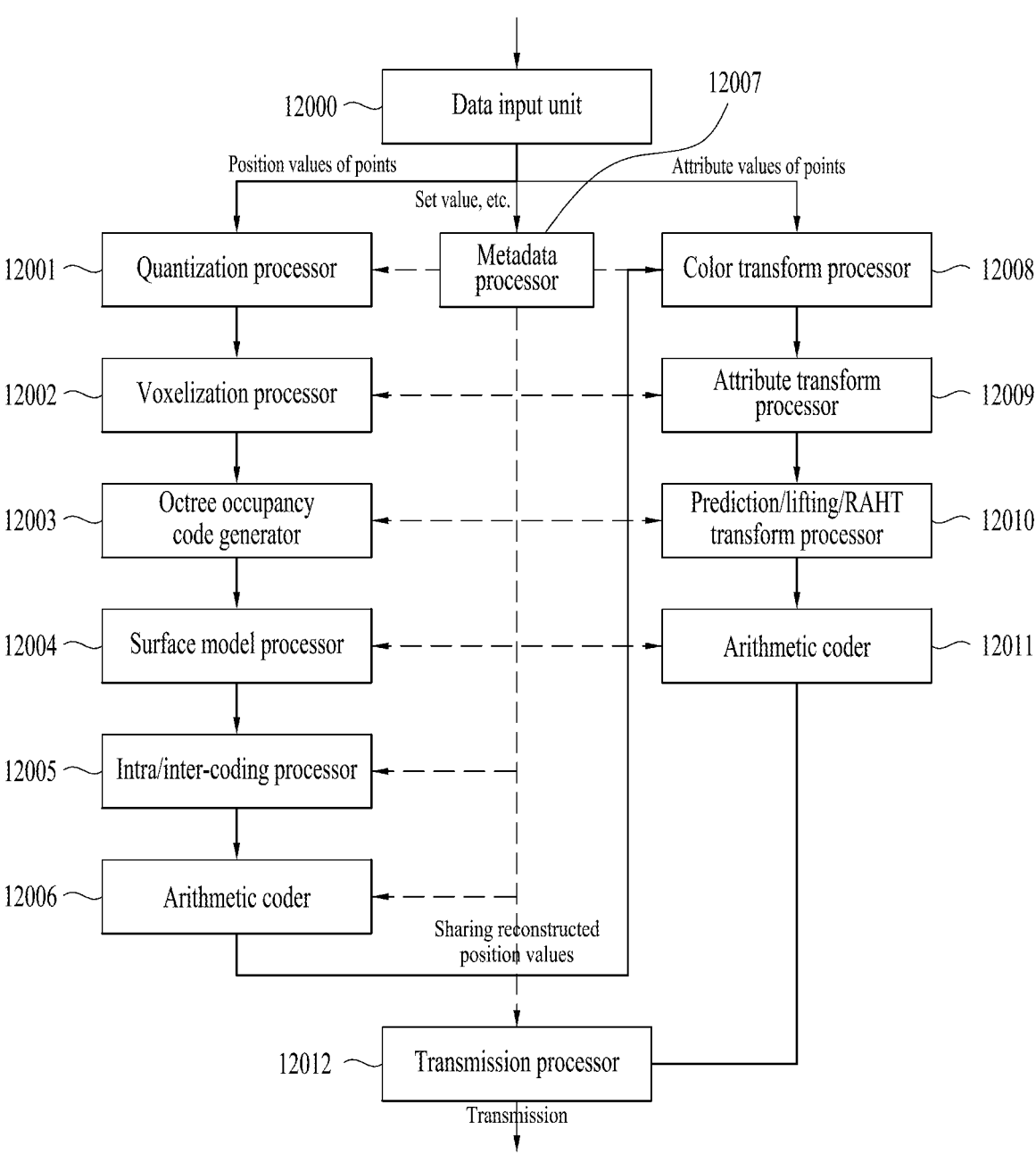
FIG. 12 illustrates a transmission device according to embodiments.

FIG. 12 illustrates a transmission device according to embodiments.

The transmission device shown in FIG. 12 is an example of the transmission device 10000 of FIG. 1 (or the point cloud encoder of FIG. 4). The transmission device illustrated in FIG. 12 may perform one or more of the operations and methods the same as or similar to those of the point cloud encoder described with reference to FIGS. 1 to 9. The transmission device according to the embodiments may include a data input unit 12000, a quantization processor 12001, a voxelization processor 12002, an octree occupancy code generator 12003, a surface model processor 12004, an intra/inter-coding processor 12005, an arithmetic coder 12006, a metadata processor 12007, a color transform processor 12008, an attribute transform processor 12009, a prediction/lifting/RAHT transform processor 12010, an arithmetic coder 12011 and/or a transmission processor 12012.

The data input unit 12000 according to the embodiments receives or acquires point cloud data. The data input unit 12000 may perform an operation and/or acquisition method the same as or similar to the operation and/or acquisition method of the point cloud video acquirer 10001 (or the acquisition process 20000 described with reference to FIG. 2).

The data input unit 12000, the quantization processor 12001, the voxelization processor 12002, the octree occupancy code generator 12003, the surface model processor 12004, the intra/inter-coding processor 12005, and the arithmetic coder 12006 perform geometry encoding. The geometry encoding according to the embodiments is the same as or similar to the geometry encoding described with reference to FIGS. 1 to 9, and thus a detailed description thereof is omitted.

The quantization processor 12001 according to the embodiments quantizes geometry (e.g., position values of points). The operation and/or quantization of the quantization processor 12001 is the same as or similar to the operation and/or quantization of the quantizer 40001 described with reference to FIG. 4. Details are the same as those described with reference to FIGS. 1 to 9.

The voxelization processor 12002 according to the embodiments voxelizes the quantized position values of the points. The voxelization processor 120002 may perform an operation and/or process the same or similar to the operation and/or the voxelization process of the quantizer 40001 described with reference to FIG. 4. Details are the same as those described with reference to FIGS. 1 to 9.

The octree occupancy code generator 12003 according to the embodiments performs octree coding on the voxelized positions of the points based on an octree structure. The octree occupancy code generator 12003 may generate an occupancy code. The octree occupancy code generator 12003 may perform an operation and/or method the same as or similar to the operation and/or method of the point cloud encoder (or the octree analyzer 40002) described with reference to FIGS. 4 and 6. Details are the same as those described with reference to FIGS. 1 to 9.

The surface model processor 12004 according to the embodiments may perform trisoup geometry encoding based on a surface model to reconstruct the positions of points in a specific region (or node) on a voxel basis. The surface model processor 12004 may perform an operation and/or method the same as or similar to the operation and/or method of the point cloud encoder (e.g., the surface approximation analyzer 40003) described with reference to FIG. 4. Details are the same as those described with reference to FIGS. 1 to 9.

The intra/inter-coding processor 12005 according to the embodiments may perform intra/inter-coding on point cloud data. The intra/inter-coding processor 12005 may perform coding the same as or similar to the intra/inter-coding described with reference to FIG. 7. Details are the same as those described with reference to FIG. 7. According to embodiments, the intra/inter-coding processor 12005 may be included in the arithmetic coder 12006.

The arithmetic coder 12006 according to the embodiments performs entropy encoding on an octree of the point cloud data and/or an approximated octree. For example, the encoding scheme includes arithmetic encoding. The arithmetic coder 12006 performs an operation and/or method the same as or similar to the operation and/or method of the arithmetic encoder 40004.

The metadata processor 12007 according to the embodiments processes metadata about the point cloud data, for example, a set value, and provides the same to a necessary processing process such as geometry encoding and/or attribute encoding. Also, the metadata processor 12007 according to the embodiments may generate and/or process signaling information related to the geometry encoding and/or the attribute encoding. The signaling information according to the embodiments may be encoded separately from the geometry encoding and/or the attribute encoding. The signaling information according to the embodiments may be interleaved.

The color transform processor 12008, the attribute transform processor 12009, the prediction/lifting/RAHT transform processor 12010, and the arithmetic coder 12011 perform the attribute encoding. The attribute encoding according to the embodiments is the same as or similar to the attribute encoding described with reference to FIGS. 1 to 9, and thus a detailed description thereof is omitted.

The color transform processor 12008 according to the embodiments performs color transform coding to transform color values included in attributes. The color transform processor 12008 may perform color transform coding based on the reconstructed geometry. The reconstructed geometry is the same as described with reference to FIGS. 1 to 9. Also, it performs an operation and/or method the same as or similar to the operation and/or method of the color transformer 40006 described with reference to FIG. 4 is performed. The detailed description thereof is omitted.

The attribute transform processor 12009 according to the embodiments performs attribute transformation to transform the attributes based on the reconstructed geometry and/or the positions on which geometry encoding is not performed. The attribute transform processor 12009 performs an operation and/or method the same as or similar to the operation and/or method of the attribute transformer 40007 described with reference to FIG. 4. A detailed description thereof is omitted. The prediction/lifting/RAHT transform processor 12010 according to the embodiments may code the transformed attributes by any one or a combination of RAHT coding, prediction transform coding, and lifting transform coding. The prediction/lifting/RAHT transform processor 12010 performs at least one of the operations the same as or similar to the operations of the RAHT transformer 40008, the LOD generator 40009, and the lifting transformer 40010 described with reference to FIG. 4. In addition, the prediction transform coding, the lifting transform coding, and the RAHT transform coding are the same as those described with reference to FIGS. 1 to 9, and thus a detailed description thereof is omitted.

The arithmetic coder 12011 according to the embodiments may encode the coded attributes based on the arithmetic coding. The arithmetic coder 12011 performs an operation and/or method the same as or similar to the operation and/or method of the arithmetic encoder 400012.

The transmission processor 12012 according to the embodiments may transmit each bitstream containing encoded geometry and/or encoded attributes and metadata information, or transmit one bitstream configured with the encoded geometry and/or the encoded attributes and the metadata information. When the encoded geometry and/or the encoded attributes and the metadata information according to the embodiments are configured into one bitstream, the bitstream may include one or more sub-bitstreams. The bitstream according to the embodiments may contain signaling information including a sequence parameter set (SPS) for signaling of a sequence level, a geometry parameter set (GPS) for signaling of geometry information coding, an attribute parameter set (APS) for signaling of attribute information coding, and a tile parameter set (TPS) for signaling of a tile level, and slice data. The slice data may include information about one or more slices. One slice according to embodiments may include one geometry bitstream Geom00 and one or more attribute bitstreams Attr00 and Attr10.

A slice refers to a series of syntax elements representing the entirety or part of a coded point cloud frame.

The TPS according to the embodiments may include information about each tile (e.g., coordinate information and height/size information about a bounding box) for one or more tiles. The geometry bitstream may contain a header and a payload. The header of the geometry bitstream according to the embodiments may contain a parameter set identifier (geom_parameter_set_id), a tile identifier (geom_tile_id) and a slice identifier (geom_slice_id) included in the GPS, and information about the data contained in the payload. As described above, the metadata processor 12007 according to the embodiments may generate and/or process the signaling information and transmit the same to the transmission processor 12012. According to embodiments, the elements to perform geometry encoding and the elements to perform attribute encoding may share data/information with each other as indicated by dotted lines. The transmission processor 12012 according to the embodiments may perform an operation and/or transmission method the same as or similar to the operation and/or transmission method of the transmitter 10003. Details are the same as those described with reference to FIGS. 1 and 2, and thus a description thereof is omitted.

Figure 13:
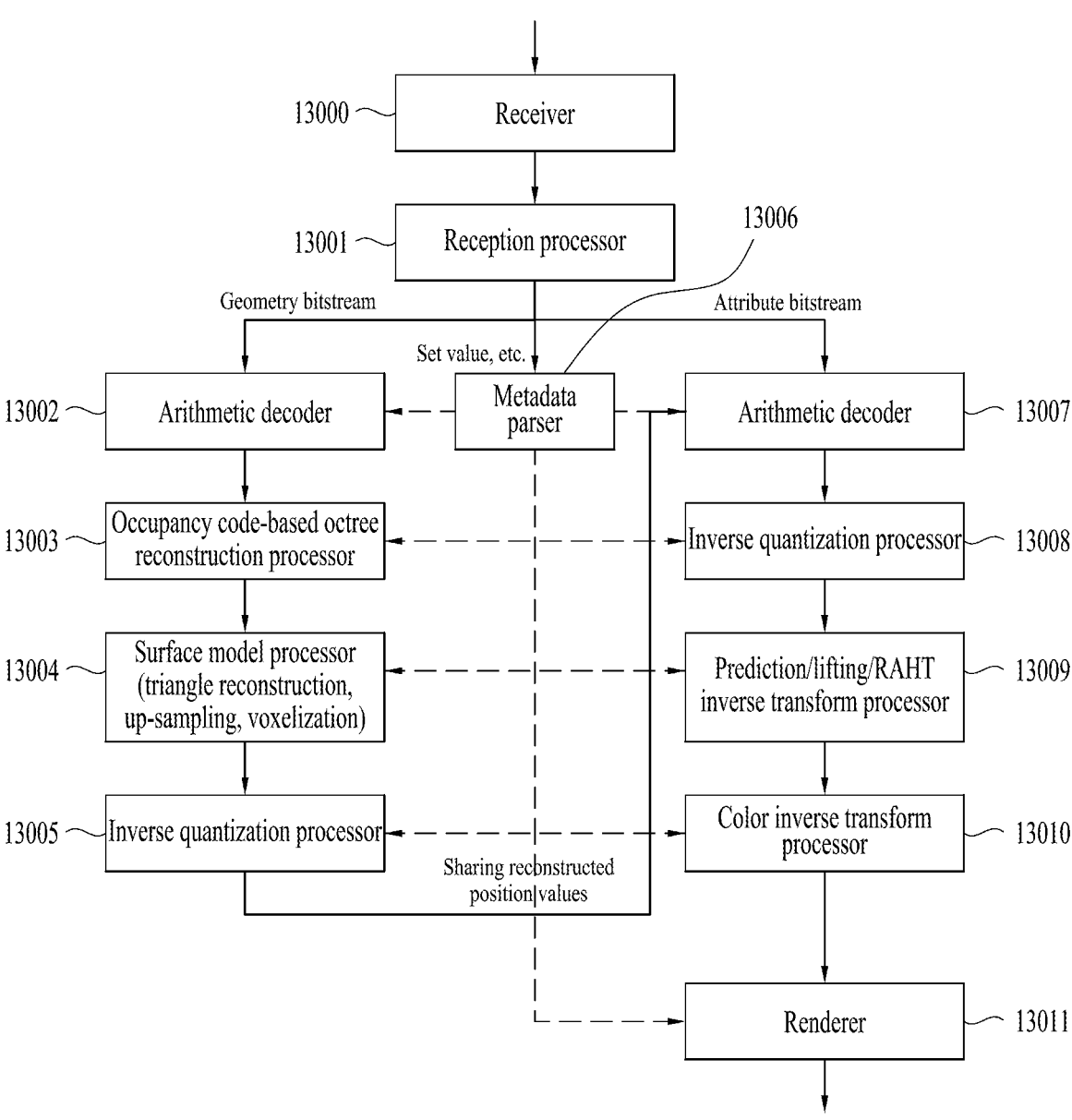
FIG. 13 illustrates a reception device according to embodiments.

FIG. 13 illustrates a reception device according to embodiments.

The reception device illustrated in FIG. 13 is an example of the reception device 10004 of FIG. 1 (or the point cloud decoder of FIGS. 10 and 11). The reception device illustrated in FIG. 13 may perform one or more of the operations and methods the same as or similar to those of the point cloud decoder described with reference to FIGS. 1 to 11.

The reception device according to the embodiment may include a receiver 13000, a reception processor 13001, an arithmetic decoder 13002, an occupancy code-based octree reconstruction processor 13003, a surface model processor (triangle reconstruction, up-sampling, voxelization) 13004, an inverse quantization processor 13005, a metadata parser 13006, an arithmetic decoder 13007, an inverse quantization processor 13008, a prediction/lifting/RAHT inverse transform processor 13009, a color inverse transform processor 13010, and/or a renderer 13011. Each element for decoding according to the embodiments may perform a reverse process to the operation of a corresponding element for encoding according to the embodiments.

The receiver 13000 according to the embodiments receives point cloud data. The receiver 13000 may perform an operation and/or reception method the same as or similar to the operation and/or reception method of the receiver 10005 of FIG. 1. The detailed description thereof is omitted.

The reception processor 13001 according to the embodiments may acquire a geometry bitstream and/or an attribute bitstream from the received data. The reception processor 13001 may be included in the receiver 13000.

The arithmetic decoder 13002, the occupancy code-based octree reconstruction processor 13003, the surface model processor 13004, and the inverse quantization processor 13005 may perform geometry decoding. The geometry decoding according to embodiments is the same as or similar to the geometry decoding described with reference to FIGS. 1 to 10, and thus a detailed description thereof is omitted.

The arithmetic decoder 13002 according to the embodiments may decode the geometry bitstream based on arithmetic coding. The arithmetic decoder 13002 performs an operation and/or coding the same as or similar to the operation and/or coding of the arithmetic decoder 11000.

The occupancy code-based octree reconstruction processor 13003 according to the embodiments may reconstruct an octree by acquiring an occupancy code from the decoded geometry bitstream (or information about the geometry secured as a result of decoding). The occupancy code-based octree reconstruction processor 13003 performs an operation and/or method the same as or similar to the operation and/or octree generation method of the octree synthesizer 11001. When the trisoup geometry encoding is applied, the surface model processor 13004 according to the embodiments may perform trisoup geometry decoding and related geometry reconstruction (e.g., triangle reconstruction, up-sampling, voxelization) based on the surface model method. The surface model processor 13004 performs an operation the same as or similar to that of the surface approximation synthesizer 11002 and/or the geometry reconstructor 11003.

The inverse quantization processor 13005 according to the embodiments may inversely quantize the decoded geometry.

The metadata parser 13006 according to the embodiments may parse metadata contained in the received point cloud data, for example, a set value. The metadata parser 13006 may pass the metadata to geometry decoding and/or attribute decoding. The metadata is the same as that described with reference to FIG. 12, and thus a detailed description thereof is omitted.

The arithmetic decoder 13007, the inverse quantization processor 13008, the prediction/lifting/RAHT inverse transform processor 13009 and the color inverse transform processor 13010 perform attribute decoding. The attribute decoding is the same as or similar to the attribute decoding described with reference to FIGS. 1 to 10, and thus a detailed description thereof is omitted.

The arithmetic decoder 13007 according to the embodiments may decode the attribute bitstream by arithmetic coding. The arithmetic decoder 13007 may decode the attribute bitstream based on the reconstructed geometry. The arithmetic decoder 13007 performs an operation and/or coding the same as or similar to the operation and/or coding of the arithmetic decoder 11005.

The inverse quantization processor 13008 according to the embodiments may inversely quantize the decoded attribute bitstream. The inverse quantization processor 13008 performs an operation and/or method the same as or similar to the operation and/or inverse quantization method of the inverse quantizer 11006.

The prediction/lifting/RAHT inverse transform processor 13009 according to the embodiments may process the reconstructed geometry and the inversely quantized attributes. The prediction/lifting/RAHT inverse transform processor 13009 performs one or more of operations and/or decoding the same as or similar to the operations and/or decoding of the RAHT transformer 11007, the LOD generator 11008, and/or the inverse lifter 11009. The color inverse transform processor 13010 according to the embodiments performs inverse transform coding to inversely transform color values (or textures) included in the decoded attributes. The color inverse transform processor 13010 performs an operation and/or inverse transform coding the same as or similar to the operation and/or inverse transform coding of the color inverse transformer 11010. The renderer 13011 according to the embodiments may render the point cloud data.

Figure 14:
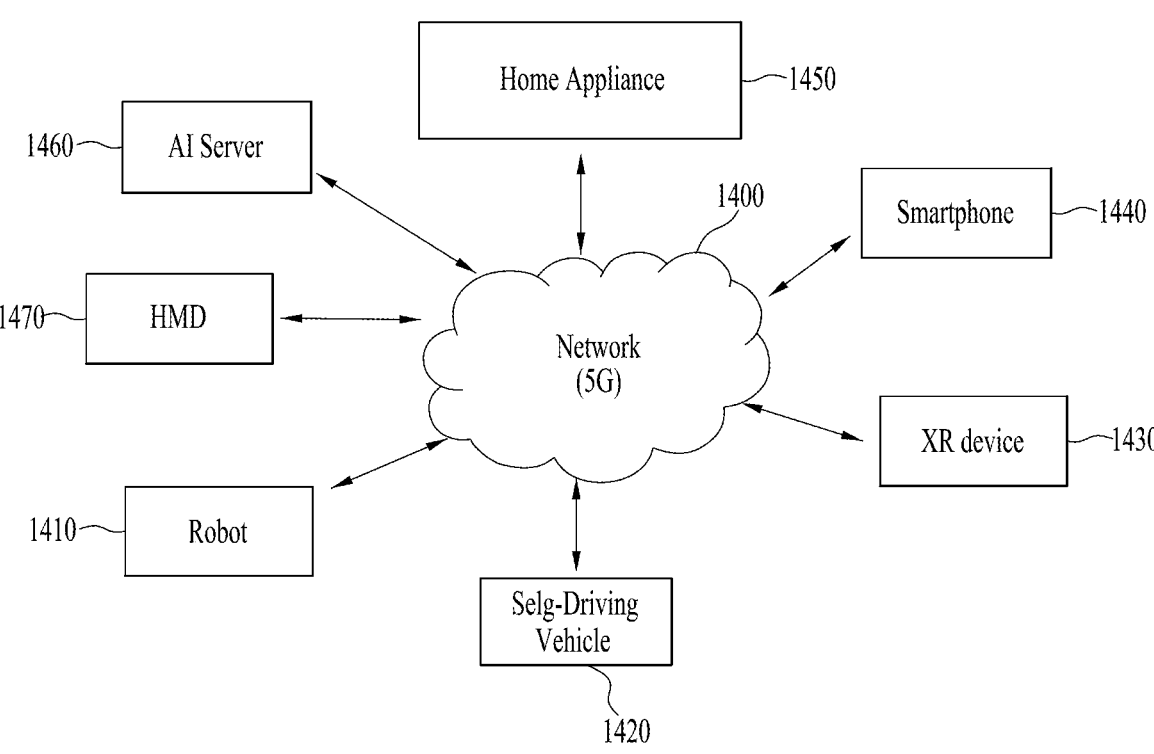
FIG. 14 illustrates an exemplary structure operable in connection with point cloud data transmission/reception methods/devices according to embodiments.

FIG. 14 illustrates an exemplary structure operable in connection with point cloud data transmission/reception methods/devices according to embodiments.

The structure of FIG. 14 represents a configuration in which at least one of a server 1460, a robot 1410, a self-driving vehicle 1420, an XR device 1430, a smartphone 1440, a home appliance 1450, and/or a head-mount display (HMD) 1470 is connected to the cloud network 1400. The robot 1410, the self-driving vehicle 1420, the XR device 1430, the smartphone 1440, or the home appliance 1450 is called a device. Further, the XR device 1430 may correspond to a point cloud data (PCC) device according to embodiments or may be operatively connected to the PCC device.

The cloud network 1400 may represent a network that constitutes part of the cloud computing infrastructure or is present in the cloud computing infrastructure. Here, the cloud network 1400 may be configured using a 3G network, 4G or Long Term Evolution (LTE) network, or a 5G network.

The server 1460 may be connected to at least one of the robot 1410, the self-driving vehicle 1420, the XR device 1430, the smartphone 1440, the home appliance 1450, and/or the HMD 1470 over the cloud network 1400 and may assist in at least a part of the processing of the connected devices 1410 to 1470.

The HMD 1470 represents one of the implementation types of the XR device and/or the PCC device according to the embodiments. The HMD type device according to the embodiments includes a communication unit, a control unit, a memory, an I/O unit, a sensor unit, and a power supply unit.

Hereinafter, various embodiments of the devices 1410 to 1450 to which the above-described technology is applied will be described. The devices 1410 to 1450 illustrated in FIG. 14 may be operatively connected/coupled to a point cloud data transmission device and reception according to the above-described embodiments.

<PCC+XR>

The XR/PCC device 1430 may employ PCC technology and/or XR (AR+VR) technology, and may be implemented as an HMD, a head-up display (HUD) provided in a vehicle, a television, a mobile phone, a smartphone, a computer, a wearable device, a home appliance, a digital signage, a vehicle, a stationary robot, or a mobile robot.

The XR/PCC device 1430 may analyze 3D point cloud data or image data acquired through various sensors or from an external device and generate position data and attribute data about 3D points. Thereby, the XR/PCC device 1430 may acquire information about the surrounding space or a real object, and render and output an XR object. For example, the XR/PCC device 1430 may match an XR object including auxiliary information about a recognized object with the recognized object and output the matched XR object.

<PCC+XR+Mobile Phone>

The XR/PCC device 1430 may be implemented as a mobile phone 1440 by applying PCC technology.

The mobile phone 1440 may decode and display point cloud content based on the PCC technology.

<PCC+Self-Driving+XR>

The self-driving vehicle 1420 may be implemented as a mobile robot, a vehicle, an unmanned aerial vehicle, or the like by applying the PCC technology and the XR technology.

The self-driving vehicle 1420 to which the XR/PCC technology is applied may represent a self-driving vehicle provided with means for providing an XR image, or a self-driving vehicle that is a target of control/interaction in the XR image. In particular, the self-driving vehicle 1420 which is a target of control/interaction in the XR image may be distinguished from the XR device 1430 and may be operatively connected thereto.

The self-driving vehicle 1420 having means for providing an XR/PCC image may acquire sensor information from sensors including a camera, and output the generated XR/PCC image based on the acquired sensor information. For example, the self-driving vehicle 1420 may have an HUD and output an XR/PCC image thereto, thereby providing an occupant with an XR/PCC object corresponding to a real object or an object present on the screen.

When the XR/PCC object is output to the HUD, at least a part of the XR/PCC object may be output to overlap the real object to which the occupant's eyes are directed. On the other hand, when the XR/PCC object is output on a display provided inside the self-driving vehicle, at least a part of the XR/PCC object may be output to overlap an object on the screen. For example, the self-driving vehicle 1220 may output XR/PCC objects corresponding to objects such as a road, another vehicle, a traffic light, a traffic sign, a two-wheeled vehicle, a pedestrian, and a building.

The virtual reality (VR) technology, the augmented reality (AR) technology, the mixed reality (MR) technology and/or the point cloud compression (PCC) technology according to the embodiments are applicable to various devices.

In other words, the VR technology is a display technology that provides only CG images of real-world objects, backgrounds, and the like. On the other hand, the AR technology refers to a technology that shows a virtually created CG image on the image of a real object. The MR technology is similar to the AR technology described above in that virtual objects to be shown are mixed and combined with the real world. However, the MR technology differs from the AR technology in that the AR technology makes a clear distinction between a real object and a virtual object created as a CG image and uses virtual objects as complementary objects for real objects, whereas the MR technology treats virtual objects as objects having equivalent characteristics as real objects. More specifically, an example of MR technology applications is a hologram service.

Recently, the VR, AR, and MR technologies are sometimes referred to as extended reality (XR) technology rather than being clearly distinguished from each other. Accordingly, embodiments of the present disclosure are applicable to any of the VR, AR, MR, and XR technologies. The encoding/decoding based on PCC, V-PCC, and G-PCC techniques is applicable to such technologies.

The PCC method/device according to the embodiments may be applied to a vehicle that provides a self-driving service.

A vehicle that provides the self-driving service is connected to a PCC device for wired/wireless communication.

When the point cloud data (PCC) transmission/reception device according to the embodiments is connected to a vehicle for wired/wireless communication, the device may receive/process content data related to an AR/VR/PCC service, which may be provided together with the self-driving service, and transmit the same to the vehicle. In the case where the PCC transmission/reception device is mounted on a vehicle, the PCC transmission/reception device may receive/process content data related to the AR/VR/PCC service according to a user input signal input through a user interface device and provide the same to the user. The vehicle or the user interface device according to the embodiments may receive a user input signal. The user input signal according to the embodiments may include a signal indicating the self-driving service.

Figure 29:
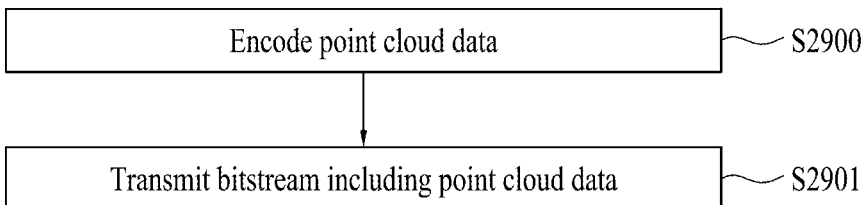
FIG. 29 illustrates a point cloud data transmission method according to embodiments.

A point cloud data transmission method/device according to embodiments is interpreted as a term referring to the transmission device 10000, the point cloud video encoder 10002, and the transmitter 10003 in FIG. 1, acquisition, encoding, and transmission 20000, 20001, and 20002 in FIG. 2, the encoder of FIG. 4, the transmission device of FIG. 12, the devices in FIG. 14, encoding in FIGS. 15 to 21, bitstream and parameter generation in FIGS. 22 to 26, encoding in FIG. 27, and/or the transmission method of FIG. 29.

Figure 28:
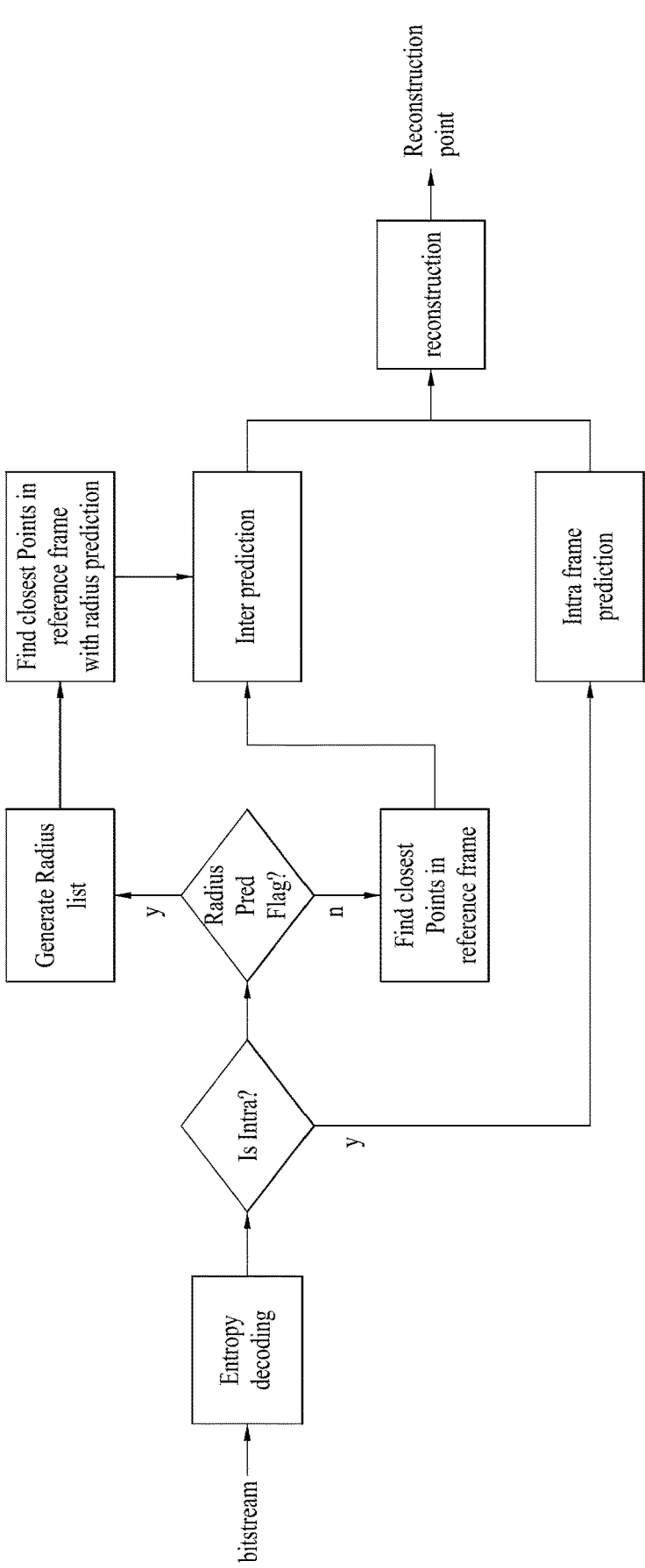
FIG. 28 illustrates a point cloud data reception device according to embodiments.
Figure 30:
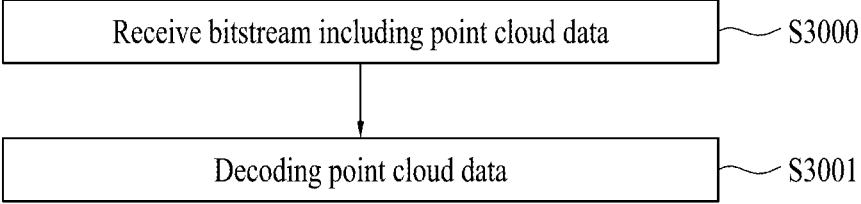
FIG. 30 illustrates a point cloud data reception method according to embodiments.

The point cloud data reception method/device according to embodiments is interpreted as a term referring to the reception device 10004, the receiver 10005, and the point cloud video decoder 10006 in FIG. 1, transmission, decoding, and rendering 20002, 20003, and 20004 in FIG. 2, the decoders of FIGS. 10 and 11, the reception device of FIG. 13, the devices in FIG. 14, decoding in FIGS. 15 to 21, bitstream parsing in FIGS. 22 to 26, decoding in FIG. 28, and/or the reception method of FIG. 30.

The point cloud data transmission method/device according to the embodiments may be abbreviated to a method/device according to the embodiments.

According to embodiments, geometry data, geometry information, position information, etc. that constitute point cloud data are interpreted to have the same meaning. Attribute data, attribute information, etc. that constitute the point cloud data are interpreted to have the same meaning.

The method/device according to the embodiments may include and perform a radius prediction method for inter-prediction in a predictive tree structure method.

The method/device according to the embodiments may efficiently perform radius prediction during inter-prediction in predictive geometry coding.

Embodiments propose a technique for compressing data composed of a point cloud. Specifically, for effective compression of a point cloud having one or more frames, radius prediction is considered during inter-prediction in a predictive tree structure.

Figure 15:
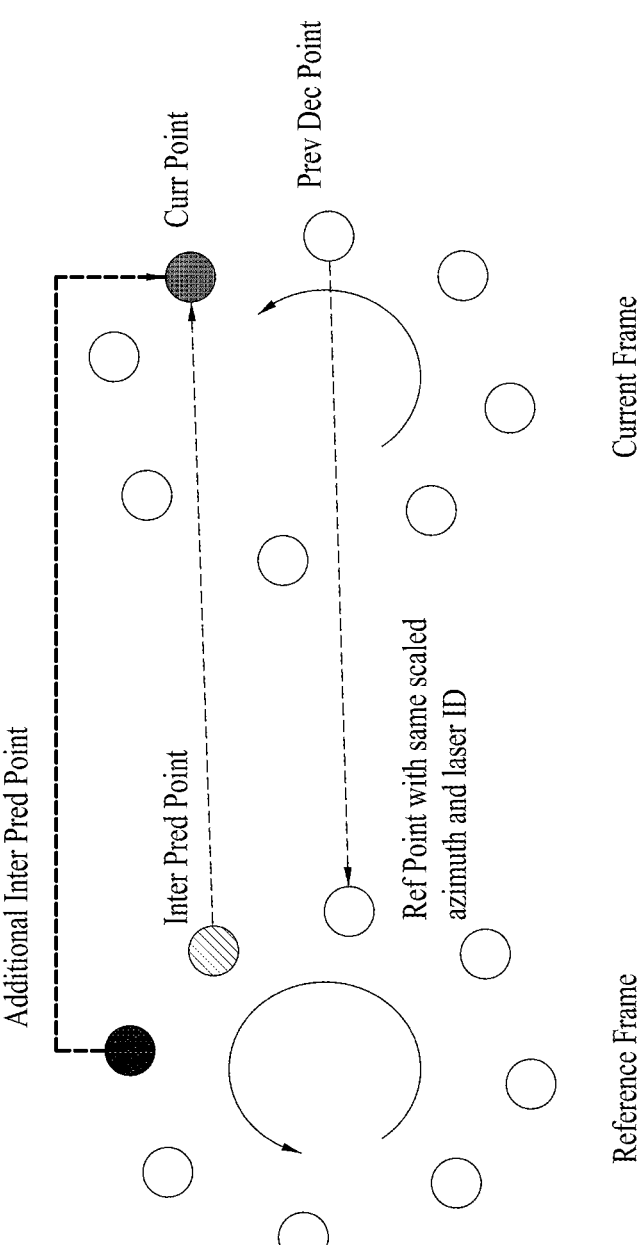
FIG. 15 illustrates predictive encoding/decoding for a current frame based on a reference frame according to embodiments.

FIG. 15 illustrates predictive encoding/decoding for a current frame based on a reference frame according to embodiments.

The point cloud data transmission method/device according to the embodiments (the transmission device 10000, the point cloud video encoder 10002, and the transmitter 10003 in FIG. 1, acquisition, encoding, and transmission 20000, 20001, and 20002 in FIG. 2, the encoder of FIG. 4, the transmission device of FIG. 12, the devices in FIG. 14, encoding in FIGS. 15 to 21, bitstream and parameter generation in FIGS. 22 to 26, encoding in FIG. 27, and/or the transmission method of FIG. 29) and the point cloud data reception method/device according to the embodiments (the reception device 10004, the receiver 10005, and the point cloud video decoder 10006 in FIG. 1, transmission, decoding, and rendering 20002, 20003, and 20004 in FIG. 2, the decoders of FIGS. 10 and 11, the reception device of FIG. 13, the devices in FIG. 14, decoding in FIGS. 15 to 21, bitstream parsing in FIGS. 22 to 26, decoding in FIG. 28, and/or the reception method of FIG. 30) may generate a predictive value for a point included in a current frame from a point included in a reference frame. If a residual between the predictive value and a geometry/attribute of a current point is transmitted in a bitstream, the size of the bitstream may be efficiently reduced. If one or more frames are consecutive, inter-prediction (inter-frame prediction) may be efficient because there may be similar points between the frames.

Inter-prediction in a current predictive tree structure uses one previous coded frame as a reference frame, and a point having the most similar azimuth (azimuth may be named in various ways) to and the same laser ID (laserID) as a previously decoded point in a current frame is detected from the reference frame. A point, which is closest or next closest to the detected point among points with a larger azimuth than an azimuth of the detected point is determined as a predictive value or a predictor of a current point. In this case, the case of using the closest point as the predictor and the case of using the second closest point as the predictor are indicated (separated) by flags and signaled. When inter-prediction is performed, which point information will be used as the position of the current point is determined through RDO, and information about the corresponding predictor is transmitted to a receiver.

When applying the above inter-prediction method in the predictive tree structure, only a laser ID and an azimuth are considered and a radius is not predicted, so that a residual may be increased. According to a processing method for configuring original data as one frame after capture, points may have the same laser ID and azimuth, and the case in which a radius occurs is not considered. In addition, during inter-prediction, since the closest azimuth among azimuths of values greater than a quantized azimuth of an azimuth of the last decoded point of a current frame is detected from a reference frame, even points with different azimuths and different radii may be mapped to points with the same azimuth and the same radius.

Referring to FIG. 15, points acquired (captured) by a LiDAR camera are distributed, and each point may have a laser ID, an azimuth, and a radius value. When detecting predictive data for a current frame from a reference frame, the laser ID and the azimuth may be considered, and a radius may additionally be considered to perform prediction for the current point.

A method for predicting a radius in an inter-predictive method of a predictive geometry is proposed.

A list for predicting a radius in inter-prediction of a predictive geometry may be generated.

The radius may be predicted according to a pre-specified mode in predictive geometry inter-prediction.

When generating a radius list upon predicting the radius in predictive geometry inter-prediction, whether to predict the radius may be determined depending on the size of the radius list.

Figure 16:
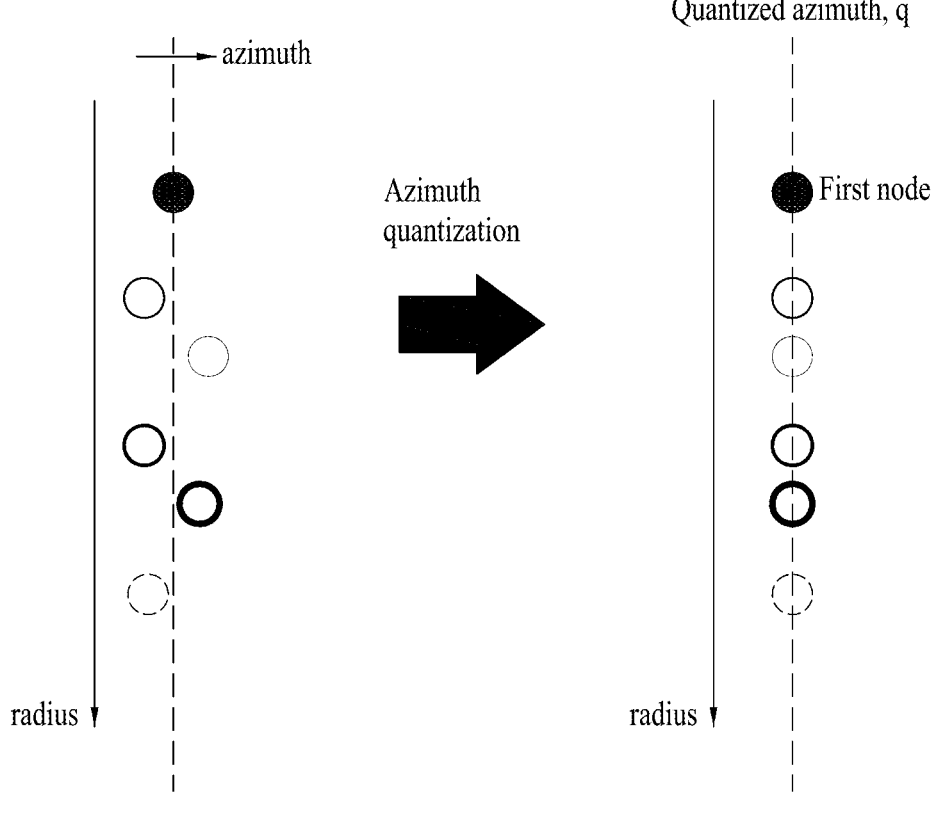
FIG. 16 illustrates a method of configuring a list for radius prediction in predictive geometry inter-prediction according to embodiments.

FIG. 16 illustrates a method of configuring a list for radius prediction in predictive geometry inter-prediction according to embodiments.

The method of configuring the list for radius prediction in predictive geometry inter-prediction of the method/device according to the embodiments is as follows.

After quantizing point cloud data, if there are points having the same azimuth and different radii, currently, only the radius of the first node, which is the first coded point, for each quantized azimuth is stored, radius prediction may not be performed, and an intra-prediction method may be applied for radius prediction.

The method/device according to the embodiments configures a separate radius list when there are two or more points with the same quantized azimuth. Since a quantized azimuth may use a single non-overlapping identifier for each laserID, a separate radius list may be configured for each quantized azimuth. In other words, the problem of increase in bitstream size because a difference in the radius is not reflected during prediction and the radius value should be transmitted may be solved by generating the radius list.

Referring to FIG. 16, points may be distributed within a certain range of azimuth, and the points may have different radii. The method/device according to the embodiments (encoder/decoder) may quantize the azimuth of a point based on a quantization parameter. Quantized points may be sorted according to the value of a constant azimuth q. Inter-prediction may be performed by considering the radii of the sorted points rather than considering the radius of only the first point of the sorted points.

Figure 17:
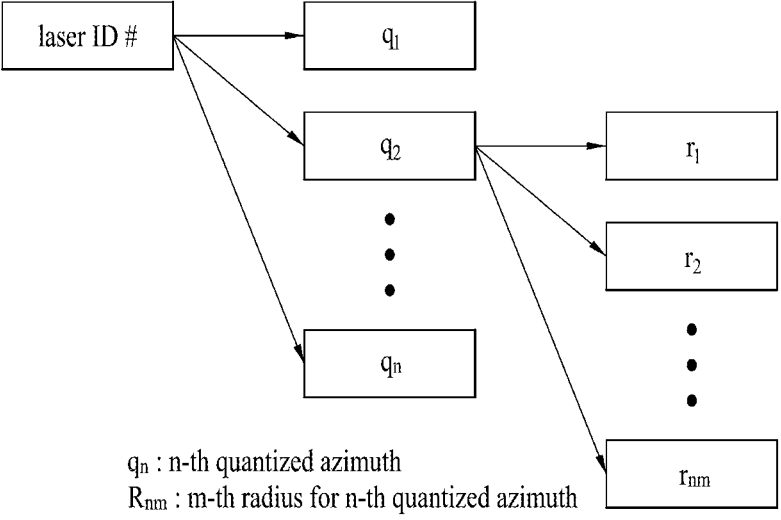
FIG. 17 illustrates a laser ID, an azimuth, and a radius for radius prediction according to embodiments.

FIG. 17 illustrates a laser ID, an azimuth, and a radius for radius prediction according to embodiments.

The point cloud data transmission method/device according to the embodiments (the transmission device 10000, the point cloud video encoder 10002, and the transmitter 10003 in FIG. 1, acquisition, encoding, and transmission 20000, 20001, and 20002 in FIG. 2, the encoder of FIG. 4, the transmission device of FIG. 12, the devices in FIG. 14, encoding in FIGS. 15 to 21, bitstream and parameter generation in FIGS. 22 to 26, encoding in FIG. 27, and/or the transmission method of FIG. 29) may generate a radius list as illustrated in FIG. 17 to perform inter-prediction. The point cloud data reception method/device according to the embodiments (the reception device 10004, the receiver 10005, and the point cloud video decoder 10006 in FIG. 1, transmission, decoding, and rendering 20002, 20003, and 20004 in FIG. 2, the decoders of FIGS. 10 and 11, the reception device of FIG. 13, the devices in FIG. 14, decoding in FIGS. 15 to 21, bitstream parsing in FIGS. 22 to 26, decoding in FIG. 28, and/or the reception method of FIG. 30) may reconstruct points compressed by the radius list illustrated in FIG. 17.

If the size of the radius list is defined, radius prediction may be performed.

A quantized azimuth q for each laser ID serves as an identifier for the radius list, and the radius list may be generated for each quantized azimuth. Each radius list may consist of m radius elements.

Referring to FIG. 17, the method/device according to the embodiments may quantize the azimuths of points for the same laser ID and configure a list of radii for points with the same azimuth. With reference to the list during inter-frame prediction for a current point, an accurate predictive value may be generated by considering all of a laserID, an azimuth, and a radius value for the point.

Figure 18:
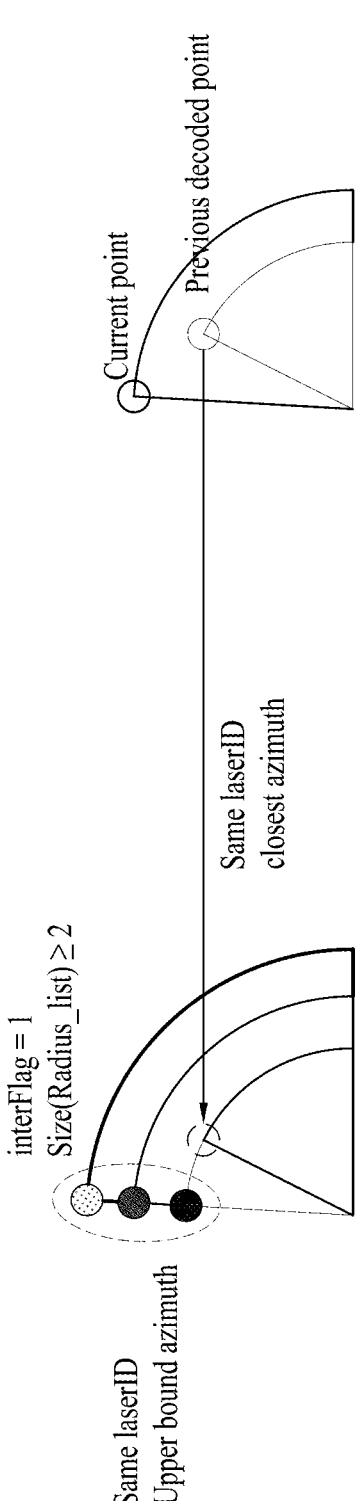
FIG. 18 illustrates a radius prediction method for predictive geometry inter-prediction according to embodiments.

FIG. 18 illustrates a radius prediction method for predictive geometry inter-prediction according to embodiments.

The radius prediction method will now be explained continuing with FIG. 17.

Among points belonging to a reference frame, points having the same azimuth or the same quantized azimuth are detected from points classified as points having the same laserID as a previously decoded point of a current frame. A point, which is closest to the detected point among points with a larger azimuth than an azimuth of a point of a reference frame connected to the previously decoded point is selected. If there is a list of radii included in the quantized azimuth, and if the size of the list is greater than or equal to 2, radius prediction is performed. Herein, "2" is an example and may be changed as needed.

Referring to FIG. 18, when a current point of a current frame is compressed using inter-frame prediction, there may be a point processed prior to the current point. A point in a reference frame (previous frame) that serves as a reference criterion for the previously processed point of the current point may be present. Points with the same laser ID as a laser ID of that point in the reference frame may be reference candidates. Based on the azimuth of that point (or quantized azimuth, i.e., quantization of an azimuth may or may not be applied as an example), points, which have larger azimuths than the azimuth of that point and have the closet azimuth to that point (hereinafter referred to as an upper bound azimuth), may be reference candidates. From this point of view, it may be appreciated that reference candidate points are selected based on the laser ID and the azimuth value based on the previously processed point in order to consider the reference candidate points. Thereafter, points belonging to the upper bound azimuth become reference candidates. Thereamong, points, for which inter-prediction is enabled (interFlag=1) and the size of a radius list of which is equal to or larger than a certain value (e.g., 2, see FIG. 17), may become the reference candidate points. A point of the reference frame may be used as a predictor of the current point. A geometry (and/or an attribute) of the current point may be viewed as a geometry (and/or an attribute) of the predictor, and a residual between the value of the current point and the value of the predictor may be generated. The residual is encoded and transmitted in a bitstream. Like transmission, a receiving side (decoder) may reconstruct original point cloud data by generating a predictive value based on an inter-prediction (radius prediction) method and summing the received residual.

Figure 19:
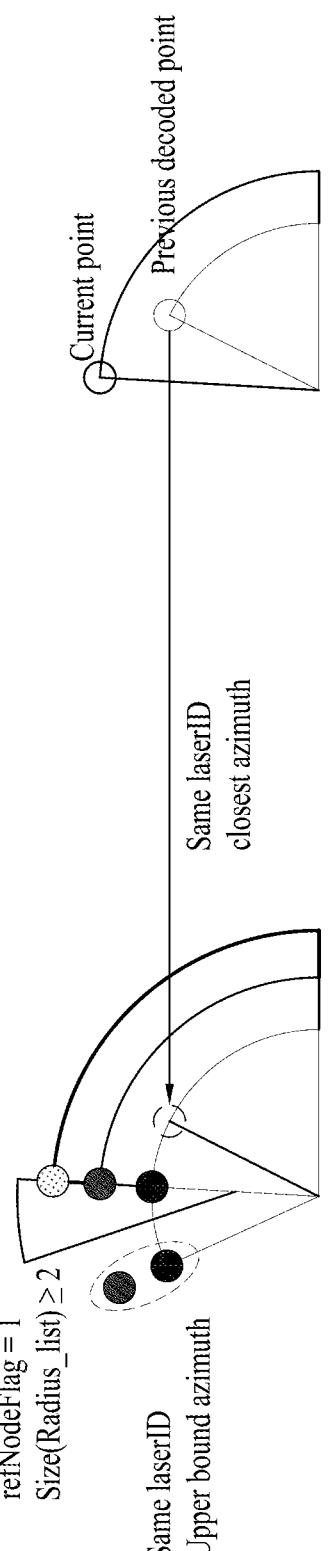
FIG. 19 illustrates a radius prediction method for predictive geometry inter-prediction according to embodiments.

FIG. 19 illustrates a radius prediction method for predictive geometry inter-prediction according to embodiments.

Inter-prediction will now be described with reference to FIG. 19 continuing with FIG. 18.

For reference, the term predictive geometry inter-prediction used herein refers to a method of predicting a current point of a current frame using a reference frame, in which a predictive geometry may mean inter-prediction of a geometry of the current point. However, inter-prediction may be applied equally or similarly to attribute prediction as well as the geometry. This process may be referred to as predictive attribute inter-prediction. However, the predictive geometry is not limited to geometry prediction and may be interpreted as inter-prediction operations for both the geometry and the attribute of a point.

When a reference node flag (refNodeFlag)=1, instead of using a point with the same laserID as a previously decoded point and with an upper bound azimuth (=azimuth with an upper bound) of the closest azimuth to the previously decoded point as a predictor (see FIG. 18), the predictor may be detected as a point with an upper bound of the upper bound azimuth, i.e., with the same laser ID and the closest azimuth value among larger azimuths than the azimuth of the previously decoded point. If a list of radii included in the corresponding quantized azimuth and the size of the list is larger than or equal to 2, radius prediction may be performed. A criterion for determining the size is exemplified as 2, but the example may be changed as needed.

In FIG. 18, an azimuth range may be set to an upper bound, or, as illustrated in FIG. 19, the azimuth range may be set to a large value like an upper bound of the upper bound.

FIG. 20 illustrates modes for radius prediction according to embodiments.

The point cloud data transmission method/device according to the embodiments may predict the radius of a current point of a current frame as the radius of a point of a reference frame according to the mode illustrated in FIG. 20 and transmit information about the mode in a bitstream.

The method/device for receiving point cloud data according to embodiments may parse the information about the mode illustrated in FIG. 20 and reconstruct a point by radius prediction according to the mode.

An example of each mode will now be described below.

Modes for selecting a radius predictor (see FIGS. 18 and 19) may have values from 0 to 4.

Mode 0 may mean selecting the radius of the first node of a radius list as before configuring the list.

Mode 1 may mean selecting a radius closest to the radius of a point decoded (processed) immediately before a current point.

Mode 2 may mean selecting the closest radius among radii that are larger than the radius of the point decoded (processed) immediately before the current point.

Mode 3 may mean selecting the closest radius among radii that are smaller than the radius of the point decoded (processed) immediately before the current point.

Mode 4 may mean selecting an average value of radius lists included in a quantized azimuth.

Figure 21:
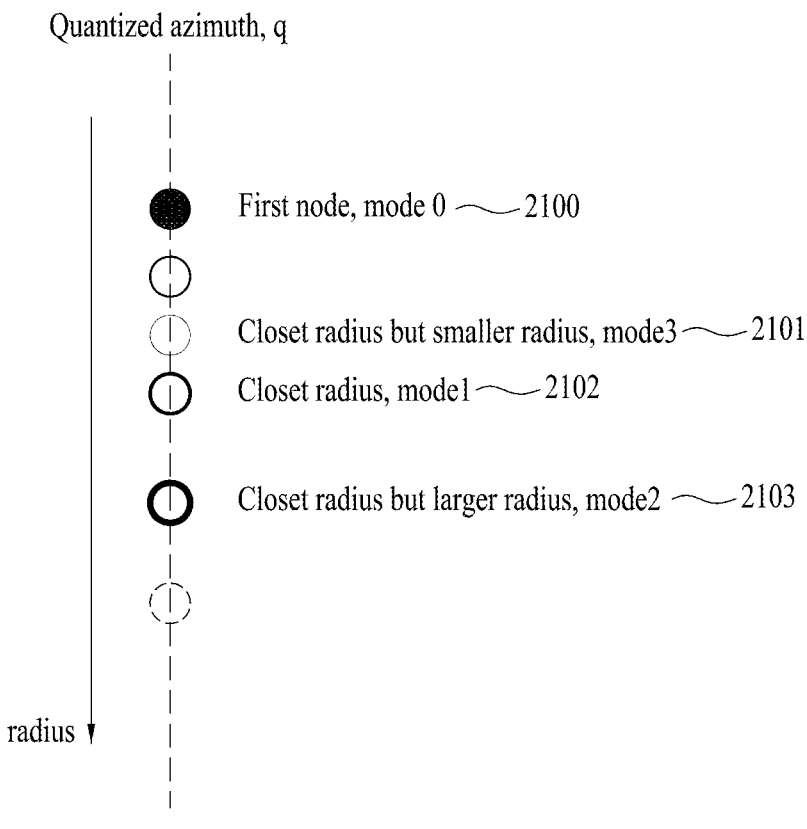
FIG. 21 illustrates modes for radius prediction according to embodiments.

FIG. 21 illustrates modes for radius prediction according to embodiments.

FIG. 21 illustrates an example of the modes for radius prediction of FIG. 20.

Points 2100 to 2103 may be points with the value of a quantized azimuth q. Alternatively, the points 2100 to 2103 may be points with the value of an azimuth q. The points may be sequentially located based on radius values thereof.

In mode 0, the point 2100 means a point with the smallest radius, i.e., a point corresponding to the first node.

In mode 1, the point 2102 means a point that has the same laser ID as a previously processed point, has the azimuth q, and has a radius of the closest value to the radius of the previously processed point.

In mode 3, the point 2101 refers to a point with a value smaller than the radius of the closest value to the radius of the previously processed point.

In mode 2, the point 2103 means a point with a value larger than the radius of the closest value to the radius of the previously processed point.

The order of information in each mode may be changed, and information about the modes may be added or deleted as needed.

Figure 22:
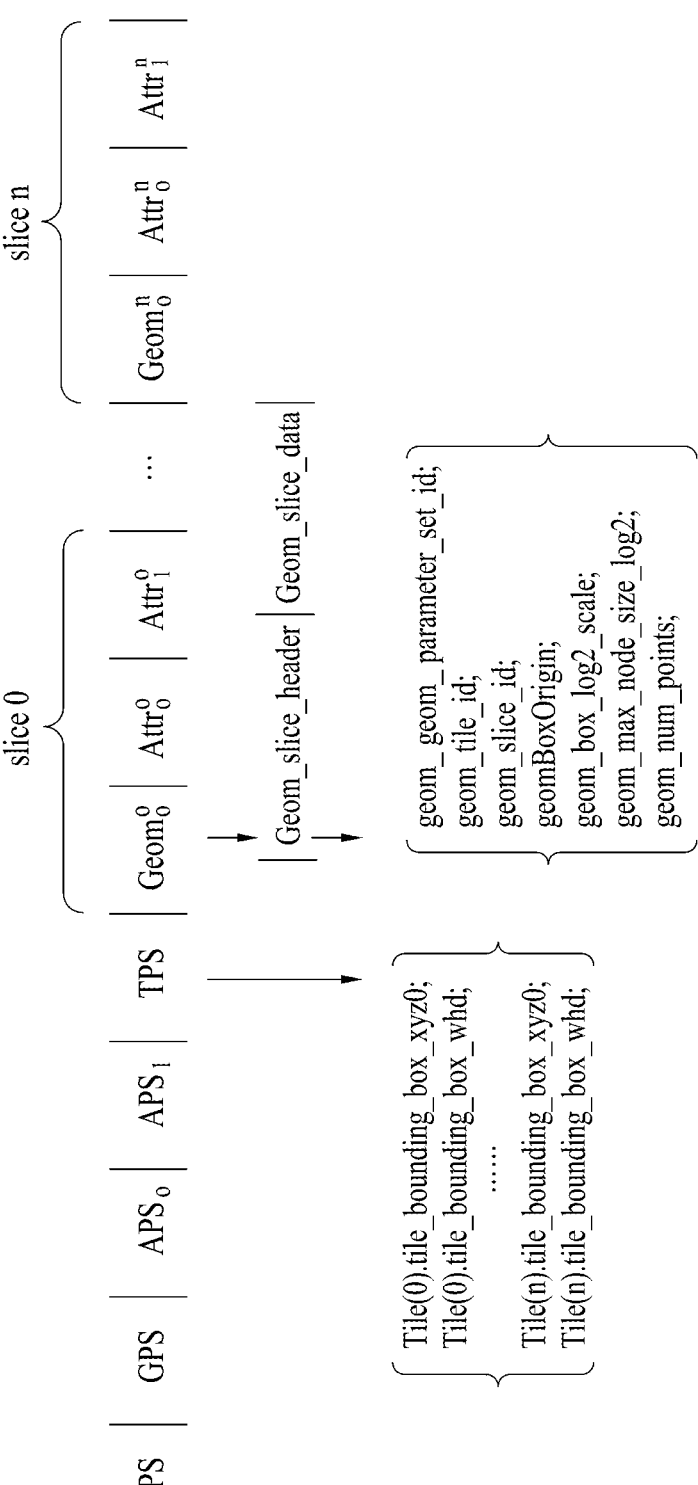
FIG. 22 illustrates a bitstream including point cloud data and parameters according to embodiments.

FIG. 22 illustrates a bitstream including point cloud data and parameters according to embodiments.

The point cloud data transmission method/device according to the embodiments may compress point cloud data, generate related parameters, and generate and transmit a bitstream as illustrated in FIG. 22. The point cloud data reception method/device according to the embodiments may receive the bitstream as illustrated in FIG. 22 and reconstruct the point cloud data based on parameter information.

The method/device according to the embodiments may generate signaling information about a radius inter-prediction prediction method from a predictive geometry according to embodiments.

Information for radius prediction may be defined in predictive geometry inter-prediction. A sequence parameter set indicates that inter-prediction of a predictive geometry node and radius prediction have been applied (included), and all or part of information required therefor may be transmitted in the sequence parameter set depending on an implementation method. Additionally, through a geometry parameter set, a slice header (alternatively referred to as a data unit), a supplemental enhancement information (SEI) message, etc., information related thereto may be transmitted. In addition, depending on an application or a system, an application range and an application method may be differently used by defining the information in a corresponding location or a separate location. If information containing similar functions is signaled in a higher level, the information may be applicable even if signaling is omitted in a parameter set of a lower level concept. Additionally, if a syntax element defined below is applicable not only to a current point cloud data stream but also to multiple point cloud data streams, the syntax element may be transmitted through a parameter set of a higher concept.

Relevant information may be signaled to add/perform embodiments. Hereinafter, parameters according to embodiments (may be called variously, such as metadata, signaling information, etc.) may be generated in a process of the transmitter according to the embodiments described later, and are transmitted to the receiver according to the embodiments and used in a reconstruction process. For example, parameters according to embodiments may be generated in a metadata processor (or metadata generator) of the trans-mission device according to the embodiments described later and may be obtained from a metadata parser of the reception device according to the embodiments. An encoded point cloud configuration will be described with reference to FIGS. 22 to 26.

Each abbreviation is as follows. SPS: Sequence parameter set, GPS: Geometry parameter set, APS: Attribute parameter set, TPS: Tile parameter set, Geometry (Geom): Geometry bitstream=Geometry slice header (=Geometry data unit header)+Geometry slice data (=Geometry data unit data), attribute (Attr): attribute bitstream=Attribute slice header (attribute data unit header)+attribute slice data (=attribute data unit data).

Tiles or slices are provided so that point clouds may be divided and processed by each area. When divided by areas, each area may have a different importance level. By pro-viding a different filter and a different filter unit depending on an importance level, a method of using a filtering method with high complexity but good quality results in an impor-tant area may be provided. Depending on the processing capacity of the receiver, appropriate latency may be ensured with better image quality and system performance in an area that is important to a user by applying different filtering to each area (area divided into tiles or slices) instead of using a complex filtering method for the entire point cloud. Therefore, when the point cloud is divided into tiles, differ-ent filters and different filter units may be applied to the tiles. When the point cloud is divided into slices, different filters and different filter units may be applied to the slices.

Referring to FIG. 20, the bitstream may include an SPS, a GPS, an APS, and a TPS. There may be multiple APSs. The TPS may include tile bounding box-related information for a plurality of tiles. For example, the TPS may include location (coordinates) information and size information (width, depth, and height) of a bounding box of a tile. The bitstream may include geometry information (data) and attribute information (data) in slice (data unit) units. Because point cloud data is encoded in units of slices (data units), the bitstream may include a plurality of slices (data units). One slice (data unit) may include geometry informa-tion (position) of one point and one or more attribute information (color, reflectance, etc.). For example, the 0-th slice (data unit) includes geometry data, and the geometry data may include a geometry slice header and geometry slice data. The geometry slice header may include information about a geometry. For example, the geometry slice header includes information about a geometry parameter set ID, information about a geometry tile ID, information about a geometry slice ID, information about an origin of a box (bounding box) containing the geometry, information about a log scale the box, information about a maximum node size, and information about the number of points.

Hereinafter, the syntax of parameters included in the bitstream will be described.

FIG. 23 illustrates an SPS according to embodiments.

FIG. 23 illustrates the SPS included in the bitstream of FIG. 22.

The SPS may include radius inter-prediction predictive information of a predictive geometry. When predictive geometry inter-prediction is performed, information related to radius prediction may be added to the SPS and signaled.

sps_interEnable: This flag indicates whether a corre-sponding sequence allows inter-prediction. If the flag denotes True, this may indicate that some frames of the sequence allow inter-prediction, and if the flag denotes False, this may indicate that all frames included in the sequence allow only intra-prediction.

numGroupOfFrame: If sps_interEnable denotes True, numGroupOfFrame may indicate the period of random access points corresponding to an intra-prediction frame. For example, if numGroupOfFrame is 8, this may mean that the first frame is predicted through intra-prediction, the next 7 frames are predicted through inter-prediction, and intra-prediction is performed again on the eighth frame. The value of numGroupOfFrame may vary depending on a sequence.

RadiusPredFlag: When inter-prediction is allowed, Radi-usPredFlag may signal whether the corresponding sequence will also predict a radius during inter-prediction. If Radius-PredFlag denotes 0 (False), this may mean that an inter-prediction method of a predictive geometry is applied, and if RadiusPredFlag denotes 1 (True), this may indicate that radius prediction is also performed.

The SPS may further include the following elements:

simple_profile_compatibility_flag: simple_profile_com-patibility_flag equal to 1 specifies that a bitstream conforms to a simple profile. simple_profile_compatibility_flag equal to 0 specifies that the bitstream conforms to a profile other than the simple profile.

dense_profile_compatibility_flag: dense_profile_com-patibility_flag equal to 1 specifies that the bitstream con-forms to a dense profile. density_profile_compatibility_flag equal to 0 specifies that the bitstream conforms to a profile other than the dense profile.

predictive_profile_compatibility_flag: predictive_pro-file_ compatibility_flag equal to 1 specifies that the bit-stream conforms to a predictive profile. predictive_profile_ compatibility_flag equal to 0 specifies that the bitstream conforms to a profile other than the predictive profile.

main_profile_compatibility_flag: main_profile_compati-bility_flag equal to 1 specifies that the bitstream conforms to a main profile. main_profile_compatibility_flag equal to 0 specifies that the bitstream conforms to a profile other than the main profile.

reserved_profile_compatibility_18bits: reserved_profile_compatibility_18bits should be equal to 0 in the bitstream conforming to this version of this document. Other values for reserved_profile_compatibility_18bits are reserved for future use by ISO/IEC. The decoder ignores the value of reserved_profile_compatibility_18bits.

slice_reordering_constraint_flag: slice_reordering_con-straint_flag equal to 1 indicates that the bitstream is sensitive to reordering and removal of a data unit. slice_reordering_ constraint_flag equal to 0 indicates that the bitstream is not sensitive to reordering and removal of the data unit.

unique_point_positions_constraint_flag: unique_point_ positions_constraint_flag equal to 1 indicates that all output points have unique positions in each point cloud frame referencing a current SPS. unique_point_positions_constraint_flag equal to 0 indicates that two or more output points may have the same position in any point cloud frame referencing the current SPS.

level_idc: level_idc indicates a level that the bitstream conforms to as specified in Appendix A. The bitstream should not contain a level_idc value other than a value specified in Appendix A. Other values of level_idc are reserved for future use by ISO/IEC.

sps_seq_parameter_set_id: sps_seq_parameter_set_id provides an identifier for the SPS so that the SPS may be referenced by other syntax elements. sps_seq_parameter_set_id should be 0 in the bitstream conforming to this version of this document. Other values of sps_seq_parameter_set_id are reserved for future use by ISO/IEC.

frame_ctr_lsb_bits: frame_ctr_lsb_bits specifies the length of a frame_ctr_lsb syntax element in bits.

slice tag bits: slice tag bits specifies the length of a slice tag syntax element in bits.

seq_origin_bits: seq_origin_bits specifies the length of a seq_origin_xyz[k] syntax element in bits.

seq_origin_xyz[k] and seq_origin_log 2_scale: seq_origin_xyz[k] and seq_origin_log 2_scale specify the origin of a sequence local coordinate system. Index k is a k-th X, Y, or Z element of an origin coordinate. If seq_origin_xyz[k] and seq_origin_log 2_scale do not exist, seq_origin_xyz[k] and seq_origin_log 2_scale values are inferred to be 0.

Array SeqOrigin is the origin of the sequence local coordinate system:

SeqOrigin[k]=seq_origin_xyz[k]<<seq_origin_log 2_scale seq_bounding_box_size_bits: seq_bounding_box_size_bits is the length of a seq_bounding_box_size_minus1_xyz [k] syntax element in bits.

seq_bounding_box_size_xyz_minus1[k]: This value plus 1 specifies a k-th element of the width, height, and depth of a coded volume dimension in an output coordinate system, respectively. If this value is not present, the coded volume dimension is not defined.

seq_unit_numerator_minus1, seq_unit_denominator_minus1, and seq_unit_in_metres_flag: Theses flags specify the length of unit vectors of an output coordinate system X, Y, and Z.

seq_global_scale_factor_log 2, seq_global_scale_refinement_num_bits, and seq_global_scale_refinement_factor: These flags specify fixed point scale factors used to derive an output point position from a position of the sequence local coordinate system.

seq_global_scale_factor_log 2: This flag is used to derive a global scale factor to be applied to the location of a point cloud.

seq_global_scale_refinement_num_bits: This flag indicates the length of the seq_global_scale_refinement_factor syntax element in bits. If seq_global_scale_refinement_num_bits is equal to 0, no refinement is applied.

seq_global_scale_refinement_factor: This flag specifies refinement for a global scale value. If this flag is not present, seq_global_scale_refinement_factor is inferred to be equal to 0.

sps_num_attributes: This flag specifies the number of attributes in a coded point cloud. It is a requirement of eligibility for a bitstream that all slices have an attribute data unit corresponding to all attribute elements listed in the SPS.

attribute_dimension_minus1[attrId]: This value plus 1 specifies the number of elements of an attrId-th attribute.

attribute_instance_id [attrId]: This flag specifies an instance identifier for the attrId-th attribute.

attribute_bitdepth_minus1[attrId]: This value plus 1 specifies the depth of each element of attrId-th attribute signal(s) in bits.

known_attribute_label_flag[attrId], known_attribute_label[attrId], and attribute_label_oid[attrId]: These flags identify a data type delivered to the attrId-th attribute. known_attribute_label_flag[attrId] indicates whether an attribute is identified by the value of known_attribute_label[attrId] or by an object identifier attribute_label_oid[attrId].

An attribute type identified by known_attribute_label may be specified. If the value of known_attribute_label is not specified, known_attribute_label is reserved for future use by ISO/IEC.

The attribute type may represent color, reflectance, opacity, a frame index, a frame number, a material identifier, a normal vector, etc.

num_attribute_parameters: This flag specifies the number of attribute parameter sets in the bitstream. An attribute parameter, which is signaled by the SPS, is applied to all data units in a coded point cloud sequence.

axis_coding_order: This flag specifies correspondence between the X, Y, and Z output axis labels and three position elements of all points in a reconstructed point cloud.

bypass_stream_enabled_flag equal to 1 specifies that a bypass coding mode may be used when reading the bitstream. bypass_stream_enabled_flag equal to 0 specifies that the bypass coding mode is not used when reading the bitstream.

entropy_continuation_enabled_flag equal to 1 indicates that an initial entropy context state of a slice may depend on a final entropy context state of a preceding slice. entropy_continuation_enabled_flag equal to 0 specifies that the initial entropy context state of each slice is independent. entropy_continuation_enabled_flag equal to 0 is a requirement of eligibility for a bitstream when slice_reordering_ constraint_ flag is equal to 0.

sps_extension_flag equal to 0 specifies that an sps_extension_data_flag syntax element is not present in an SPS syntax structure. sps_extension_flag should be equal to 0 in the bitstream conforming to this version of this document. The value 1 of sps_extension_flag is reserved for future use by ISO/IEC. The decoder should ignore any sps_extension_data_flag syntax element that follows the value 1 for sps_extension_flag in the SPS syntax structure.

sps_extension_data_flag may have any value. The presence of sps_extension_data_flag and the value thereof do not affect decoder compliance with a profile specified in Appendix A. The decoder conforming to this version of this document should ignore all sps_extension_data_flag syntax elements.

FIG. 24 illustrates a GPS according to embodiments.

FIG. 24 illustrates the GPS included in the bitstream of FIG. 22.

The GPS may include radial inter-prediction predictive information of a predictive geometry. During predictive geometry inter-prediction, information related to radius prediction may be added to the GPS and signaled.

geom_tree_type: geom_tree_type equal to 0 indicates that position information is coded using an octree. geom_tree_type equal to 1 indicates that the position information is coded using a predictive tree.

gps_interEnable: This flag indicates whether a corresponding frame allows inter-prediction. If gps_interEnable denotes True, this may indicate that some frames in a corresponding sequence allows inter-prediction, and if gps_interEnable denotes False, this may indicate that all frames included in the sequence allow only intra-prediction.

Meanwhile, a unit containing point cloud data may include a sequence, a frame, etc. The sequence may refer to all acquired point cloud data, and a frame may be a unit included in the sequence.

gps_RadiusPredFlag: When inter-prediction is allowed, gps_RadiusPredFlag may signal whether a corresponding frame is for radius prediction as well during inter-prediction. If RadiusPredFlag denotes 0, i.e., False, gps_RadiusPred-Flag means that an existing inter-prediction method of a predictive geometry is applied, and if RadiusPredFlag denotes 1, i.e., True, gps_RadiusPredFlag may indicate that radius prediction is also performed.

radius_list_size_threshold: If a radius is also predicted during inter-prediction, radius_list_size_threshold may signal a criterion of a radius list size for determining whether to perform radius prediction for each azimuth.

The GPS may further include the following information.

gps_geom_parameter_set_id identifies the GPS so as to be referenced by other DUs.

gps_seq_parameter_set_id identifies an enabled SPS with sps_seq_parameter_set_id.

slice_geom_origin_scale_present specifies whether slice_geom_origin_log 2_scale is present (i.e., 1) or not (i.e., 0) in a GDU header. slice_geom_origin_scale_present equal to 0 indicates that a slice origin scale is specified by gps_geom_origin_log 2_scale.

gps_geom_origin_log 2_scale specifies a scale factor used to derive a slice origin from slice_geom_origin_xyz when slice_geom_origin_scale_present denotes 0.

geom_dup_point_counts_enabled specifies whether a duplicate point may be signaled in the GDU by a duplicate count per point (when 1) or not (when 0).

geom_dup_point_counts_enabled equal to 0 does not prohibit coding the same point position multiple times within a single slice through means other than a direct_dup_point_cnt, occ_dup_point or ptn_dup_point_cnt syntax element.

geom_tree_type equal to 0 specifies that a slice geometry is coded using an occupancy tree (7.3.3.4). geom_tree type equal to 1 indicates that the slice geometry is coded using a predictive tree (7.3.3.8).

gps_extension_present indicates whether a gps_extension_data syntax element is present (when 1) or absent (when 0) in the GPS syntax structure. gps_extension_present is 0 in the bitstream conforming to this version of this document.

gps_extension_data may have any value. The presence of gps_extension_data and the value thereof do not affect decoder eligibility for a profile specified in this version of this document. The decoder may ignore all gps_extension_data syntax elements.

geom_angular_enabled indicates whether a slice geometry is coded (when 1) or not (when 0) using information about a set of beams positioned and rotating along a V axis of an angular origin. When geom_angular_enabled is enabled, a point position is assumed to be sampled along rays projected by a beam.

slice_angular_origin_present specifies whether a slice-related angular origin is signaled in the GDU header (when 1) or not (when 0). slice_angular_origin_present equal to 0 indicates that the angular origin is gps_angular_origin_xyz. If slice_angular_origin_present is not present, slice_angular_origin_present is inferred to be 0.

gps_angular_origin_bits_minus1 plus 1 represents the length of each gps_angular_origin_xyz syntax element in bits.

gps_angular_origin_xyz[k] represents a k-th XYZ coordinate of the angular origin in a coding coordinate system.

num_beams_minus1 plus 1 represents the number of beams enumerated by a GPS.

beam_elevation_init and beam_elevation_diff[i] together indicate a beam altitude as a slope on an S-T plane. The altitude slope of an i-th beam is expressed by an expression of BeamElev[i]. beam_elevation_init and beam_elevation_diff[i] are binary fixed-point values with 18 decimal bits.

beam_voffset_init and beam_voffset_diff[i] together indicate a V-axis offset of a beam enumerated from an angular origin. The offset is specified in units of the coding coordinate system. The offset of the i-th beam is specified as an expression of BeamOffsetV[ ].

beam_steps_per_rotation_init_minus1 and beam_steps_per_rotation_diff[[i] indicate the number of steps performed per rotation by a rotating beam. The value of the i-th beam is specified by an expression of BeamStepsPerRev[i].

ptree_ang_azimuth_pi_bits_minus11 plus 11 indicates the number of bits representing half rotation of a beam around the V axis. Half a revolution is a radian of $\pi$.

ptree_ang_radius_scale_log 2 represents a factor used to scale a radial angular coordinate of a point during conversion into Cartesian coordinates.

ptree_ang_azimuth_step_minus1 plus 1 represents an expected change in the azimuth of a rotating beam between coded points. An azimuth predictive residual used in angular predictive tree coding may be coded as a multiple of ptree_ang_azimuth_step_minus1+1 and a remainder.

occtree_point_cnt_list_present indicates whether a GDU footer lists the number of points at each occupancy tree level (when 1) or not (when 0). If occtree_point_cnt_list_present does not exist, occtree_point_cnt_list_present is inferred to be 0.

occtree_direct_coding_mode greater than 0 indicates that a point position may be coded by a direct node eligible for an occupancy tree. occtree_direct_coding_mode equal to 0 indicates that the direct node should not exist in the occupancy tree.

The larger the value of occtree_direct_coding_mode, generally the higher an eligibility ratio of direct nodes.

occtree_direct_joint_coding_enabled indicates whether a direct node that codes two points should jointly code positions according to a specific order of the points (when 1) or not (when 0).

occtree_coded_axis_list_present equal to 1 indicates that the GDU header includes an occtree_coded_axis syntax element used to derive the node size for each occupancy tree level. occtree_coded_axis_list_present equal to 0 indicates that the occtree_coded_axis syntax element is not present in a GDU syntax and that the occupancy tree represents a cubic volume specified by tree depth.

occtree_neigh_window_log 2_minus1 plus 1 represents the number of occupancy tree node positions forming each availability window within a tree level. Nodes outside the window may not be used by a process related to nodes within the window. occtree_neigh_window_log 2_minus1 equal to 0 indicates that only a sibling node should be considered to be usable in a current node.

occtree_adjacent_child_enabled indicates whether an adjacent child of an adjacent occupancy tree node is used for bit occupancy contextualization (when 1) or not (when 0). If occtree_adjacent_child_enabled is not present, occtree_adjacent_child_enabled is inferred to be 0.

occtree_intra_pred_max_nodesize_log 2 minus 1 represents the maximum size of an occupancy tree node eligible for intra-slice occupancy prediction. If occtree_intra_pred_ max_nodesize_log 2 is not present, occtree_intra_pred_ max_nodesize_log 2 is inferred to be 0.

occtree_bitwise_coding indicates whether a node occupancy bitmap is coded using an occupancy_bit syntax element (when 1) or a pre-coded occupancy byte syntax element (when 0).

occtree_planar_enabled indicates whether coding of a node occupancy bitmap is partially performed by signaling of occupancy and unoccupancy planes (when 1) or not (when 0). If occtree_planar_enabled is not present, occtree_ planar_enabled is inferred to be 0.

occtree_planar_threshold[i] represents a threshold used partially to determine eligibility for each axis for planar occupancy coding. The threshold is specified from the most probable planar axis (i=0) to a minimum potential planar axis (i=2). Each threshold represents a minimum possibility for an eligible axis for which occ_single_plane is expected to be 1. A range [8, 120] for occtree_planar_threshold corresponds to a possibility interval [0, 1].

If occtree_direct_node_rate_minus1 is present, occtree_ direct_node_rate_minus1 indicates that only occtree_direct_node_rate_minus1+1 among all 32 eligible nodes may be coded by a direct node.

occtree_planar_buffer_disabled indicates whether contextualization of an occupancy planar position of each node using a planar position of a previously coded node should be disabled (when 1) or not (when 0). If occtree_planar_buffer_ disabled is not present, occtree_planar_buffer_disabled is inferred to be 0.

geom_scaling_enabled indicates whether a coded geometry should be scaled (when 1) or not (when 0) during a geometry decoding process.

geom_qp represents a geometric quantization parameter (QP) before offsets for each slice and each node are added.

geom_qp_mul_log 2 represents a scaling factor to be applied to the geometric QP. An Exp2(3−geom_qp_mul_log 2) QP value is present until a scaling step size is doubled.

ptree_qp_period_log 2 represents the period of a node at which a predictive tree node QP offset is signaled. The period is one in every Exp2(ptree_qp_period_log 2) node.

occtree_direct_node_qp_offset represents an offset relative to the slice geometric QP in order to scale the position of a point coded by a direct node.

FIG. 25 illustrates a geometry predictive tree node according to embodiments.

FIG. 25 illustrates the geometry predictive tree node included in the bitstream of FIG. 22. The geometry predictive tree node may be transmitted in a data unit of the bitstream.

Radius inter-prediction predictive information of a predictive geometry may be added to a geometry_ predtree_node syntax.

During predictive geometry inter-prediction, information related to radius prediction may be added to the geometry_ predtree_node syntax and signaled.

Flow Char ptn_inter_flag[nodeIdx]: This flag may indicate whether a node of each predictive tree is used for inter-prediction. ptn_inter_flag equal to 0 means that an intra-prediction method has been applied, and ptn_inter_flag equal to 1 may mean that an inter-prediction method is used for prediction.

ptn_refNode_flag[nodeIdx]: When the node of each predictive tree performs inter-prediction, ptn_refNode_flag equal to 0 means that an azimuth, which is an upper bound of a previously decoded point, has been selected. ptn_refNode_flag equal to 1 indicates that an azimuth, which is an upper bound of the upper bound of the previously decoded point, has been selected.

Ptn_radius_mode[nodeIdx]: If the node of each predictive tree has been inter-predicted and radius prediction has been performed (gps_RadiusPredFlag=1), a mode applied during radius prediction may be signaled to each node. The mode to be signaled will be described with reference to FIG. 26.

FIG. 26 illustrates a radius prediction mode according to embodiments.

The first node for a quantized azimuth, a radius closest to a previously decoded point, a radius which is closest to the previously decoded point but is larger than a radius of the previously decoded point, and a radius which is closest to the previously decoded point but is smaller than the radius of the previously decoded point may be signaled through a radius prediction mode. The above modes may be represented through integer values.

Mode 0: When ptn_inter_flag is 1, a radius stored together with a quantized azimuth detected according to the value of ptn_refNode_flag may be inherited.

Mode 1: When ptn_inter_flag is 1, a radius closest to a radius of the previously decoded point, i.e., a radius with the smallest difference with the radius of the previously decoded point, may be selected from among the list of radii stored in the quantized azimuth detected according to the value of ptn_refNode_flag.

Mode 2: When ptn_inter_flag is 1, the closest value, i.e., an upper bound, among values larger than the radius closest to the radius of the previously decoded point may be selected from among the list of radii stored in the quantized azimuth detected according to the value of ptn_refNode_flag.

Mode 3: When ptn_inter_flag is 1, the closest value, i.e., a lower bound, among values smaller than the radius closest to the radius of the previously decoded point may be selected from among the list of radii stored in the quantized azimuth detected according to the value of ptn_refNode_flag.

Each mode may be previously specified and only one or two modes may be applied. The best case with a minimum residual after application of each mode may be signaled. The above mode information may be applied as needed through addition or deletion of modes.

FIG. 27 illustrates a point cloud data transmission device according to embodiments.

FIG. 27 may correspond to the point cloud data transmission method/device according to the embodiments (the transmission device 10000, the point cloud video encoder 10002, and the transmitter 10003 in FIG. 1, acquisition, encoding, and transmission 20000, 20001, and 20002 in FIG. 2, the encoder of FIG. 4, the transmission device of FIG. 12, the devices in FIG. 14, encoding in FIGS. 15 to 21, bitstream and parameter generation in FIGS. 22 to 26, encoding in FIG. 27, and/or the transmission method of FIG. 29). Each component in FIG. 27 may correspond to hardware, a processor, software, and/or a combination thereof.

An embodiment of operation of the transmission device is as follows. When point cloud data is input, the data is clustered and sorted (classified) in order to facilitate compression using a predictive geometry. After processing, it is checked whether the point cloud data is to be intra-predicted. If the point cloud data is for an intra-prediction frame, geometry intra-prediction is performed. If not, it is checked through a flag whether radius prediction is included. If the flag indicates False, radius prediction is not performed. In other words, an azimuth, which is an upper bound in a reference frame based on a previously decoded point in a current frame, may be detected, or an azimuth, which is an upper bound of the upper bound, may be used as a predictor. When performing radius prediction, a radius list is generated for each quantized azimuth, and a closest point to a current point is detected from the reference frame using a radius prediction mode and azimuth prediction information. After a prediction mode for inter-prediction is determined for all nodes including the above process, a residual and reference frame information that may occur when the prediction mode is applied are entropy-coded and generated as an output bitstream.

A clustering and sorting unit may receive the point cloud data and cluster and/or sort the point cloud data.

A predictor checks whether the prediction mode is an intra-prediction mode or not. If the prediction mode is the intra-prediction mode, intra-frame prediction is performed. An entropy encoder may entropy-code a residual generated through prediction and a transmitter may transmit a bitstream.

If the prediction mode is an inter-prediction mode rather than the intra-prediction mode, the predictor may check whether radial prediction is performed. If radius prediction is not performed, a point closest to the current point may be detected from the reference frame for the current frame and used as the predictor for the current point. When radius prediction is performed, the radius list as illustrated in FIG. 17 is generated. Through radius prediction, inter-prediction may be performed using the closest point in the reference frame as the predictor. For the radius prediction operation, reference is made to FIGS. 17 to 21. The residual generated through prediction may be entropy-coded and transmitted in the bitstream.

Each operation and module of FIG. 27 may be performed by or correspond to the encoder in FIG. 1, encoders corresponding to the encoder in FIG. 1, and/or a processor of the encoder.

FIG. 28 illustrates a point cloud data reception device according to embodiments.

FIG. 28 may correspond to the point cloud data reception method/device according to the embodiments (the reception device 10004, the receiver 10005, and the point cloud video decoder 10006 in FIG. 1, transmission, decoding, and rendering 20002, 20003, and 20004 in FIG. 2, the decoders of FIGS. 10 and 11, the reception device of FIG. 13, the devices in FIG. 14, decoding in FIGS. 15 to 21, bitstream parsing in FIGS. 22 to 26, decoding in FIG. 28, and/or the reception method of FIG. 30). Each component of FIG. 28 may correspond to hardware, a processor, software, and/or a combination thereof. Reception of FIG. 28 may perform an operation and/or a reverse operation corresponding to transmission of FIG. 27.

A receiver entropy-decodes a received bitstream. If a corresponding frame is for intra-prediction, an intra-prediction method is applied, and geometry information of a point cloud is updated. If the frame is not for intra-prediction (i.e., the frame is for inter-prediction), it is checked whether radius prediction is used. If radius prediction is not used, the closest point is selected based on a predetermined criterion from a reference frame according to prediction mode information. A current node is predicted according to the prediction mode (see FIG. 26, etc.) received from the transmitter (encoder), a residual is added, and the added residual is input to a current node. This process is repeated until reconstruction up to a leaf node of a tree of a predictive geometry is all ended. If radius prediction is used, a radius list is generated for each quantized azimuth, and a point corresponding to the prediction mode is detected. Thus, the point is inherited or a predictive value is calculated. The residual received from the transmitter is added and input to the current node. In this case, if reconstruction is ended after prediction is completed for all nodes according to a prediction mode, the reconstructed point may be sent to an attribute information predictive module to be used for attribute information prediction.

An entropy decoder receives a bitstream and decodes point cloud data based on an entropy method.

A predictor checks whether a prediction mode is an intra-prediction mode. If the prediction mode is the intra-prediction mode, intra-frame prediction is performed, and the point cloud data is reconstructed by summing a predictive value and a received residual. If the prediction mode is not the intra-prediction mode but an inter-prediction mode, it is checked whether the prediction mode is a radius prediction mode. If the prediction mode is not the radius prediction mode, a point to be used as a predictor for current point prediction is detected from a reference frame corresponding to a current frame. A point closest to a current point is detected from the reference frame. Inter-prediction is performed through prediction and the point cloud data is reconstructed. If the prediction mode is the radius prediction mode, a radius list is generated. The closest point (predictor) within the reference frame is detected through radius prediction. The point cloud data is reconstructed using a predictive value generated through radius prediction and the received residual. Reference is made to the above description of inter-prediction and radius prediction.

FIG. 29 illustrates a point cloud data transmission method according to embodiments.

The point cloud data transmission method according to embodiments may include encoding point cloud data (52900).

The encoding operation according to embodiments includes the operation of the point cloud video encoder 10002 and the transmitter 10003 in FIG. 1, acquisition, encoding, and transmission 20000, 20001, and 20002 in FIG. 2, the encoder of FIG. 4, the transmission device of FIG. 12, the devices in FIG. 14, encoding in FIGS. 15 to 21, bitstream and parameter generation in FIGS. 22 to 26, and encoding in FIG. 27 and reference is made to the above description.

The point cloud data transmission method according to the embodiments may further include transmitting a bitstream including the point cloud data (S2901).

The transmission operation according to embodiments includes the operation of the transmission device 10000 and the transmitter 10003 in FIG. 1, acquisition, encoding, and transmission 20000, 20001, and 20002 in FIG. 2, the encoder of FIG. 4, the transmission device of FIG. 12, the devices in FIG. 14, encoding in FIGS. 15 to 21, bitstream and parameter generation in FIGS. 22 to 26, and encoding in FIG. 27, and reference is made to the above description.

FIG. 30 illustrates a point cloud data reception method according to embodiments.

The point cloud data reception method according to the embodiments may include receiving a bitstream including point cloud data (S3000).

The reception operation according to embodiments includes the operation of the reception device 10004 and the receiver 10005 in FIG. 1, transmission, decoding, and rendering 20002, 20003, and 20004 in FIG. 2, the decoders of FIGS. 10 and 11, the reception device of FIG. 13, the devices in FIG. 14, decoding in FIGS. 15 to 21, bitstream parsing in FIGS. 22 to 26, and/or decoding in FIG. 28, and reference is made to the above description.

The point cloud data reception method according to embodiments may further include decoding the point cloud data (S3001).

The decoding operation according to embodiments includes the operation of the point cloud video decoder 10006, transmission, decoding, and rendering 20002, 20003, and 20004 in FIG. 2, the decoders of FIGS. 10 and 11, the reception device of FIG. 13, the devices in FIG. 14, decoding in FIGS. 15 to 21, bitstream parsing in FIGS. 22 to 26, and decoding in FIG. 28, and reference is made to the above description.

Referring to FIG. 1, the point cloud data transmission method according to the embodiments may include encoding point cloud data; and transmitting a bitstream including the point cloud data.

Referring to FIG. 15, in relation to a predictive geometry, the encoding the point cloud data may include predicting a point of a current frame including the point cloud data. The point may be predicted based on a point of a reference frame related to the current frame, and the point of the reference frame is a closest or second closest point to the point.

Referring to FIGS. 16 and 17, radius prediction may be performed by considering only the radius of the first node for a predictive geometry or by generating a radius list. In this regard, the predicting the point may include predicting the point based on an azimuth and a radius of the point cloud data and using a radius of a first node of the point cloud data distributed based on the azimuth and the radius, or predicting the point based on the azimuth and the radius of the point cloud data and generating a radius list including radii of one or more points of the azimuth.

Referring to FIGS. 18 and 19, in relation to prediction using a laser ID, an azimuth, an upper bound or an upper bound of the upper bound, the predicting the point may include detecting a point from the reference frame based on a laser ID and an azimuth of a previously processed point prior to coding a current point of the current frame and detecting a predictor of the point based on an upper bound of an azimuth of the point of the reference frame, or detecting the predictor of the point based on an upper bound of the upper bound value of the azimuth of the point of the reference frame.

Referring to FIGS. 20 and 21, in relation to radius prediction modes (mode 0 to mode 4), the predicting the point may include detecting a point having a closest radius to a radius of the previously processed point, detecting a point having a larger radius than the closest radius to the radius of the previously processed point from the reference frame, or detecting a point having a smaller radius than the closest radius to the radius of the previously processed point from the reference frame.

Referring to FIG. 22, FIG. 23 (RadiusPredFlag), FIG. 24 (radius_list_size_threshold), and FIGS. 25 and 26 (Ptn_radius_mode[nodeIdx]), the bitstream may include parameters related to prediction of the point. The parameters may include information about whether to perform radius prediction from the reference frame, information about a size of a radius list for the radius prediction, and information about a prediction mode of the point.

The point cloud data transmission method may be performed by the transmission device. The transmission device may correspond to an encoder or may be a device including the encoder and a transmitter or a device including a processor that performs encoding and a memory.

The transmission device may include an encoder that encodes point cloud data; and a transmitter that transmits a bitstream including the point cloud data.

The point cloud data reception method may correspond to the transmission method and decode encoded point cloud data in a reverse process of transmission.

The reception method may include receiving a bitstream including point cloud data; and decoding the point cloud data.

A prediction operation of the reception method may correspond to a prediction operation of the transmission method or may be a reverse order of the prediction operation of the transmission method.

The decoding the point cloud data my include predicting a point of a current frame including the point cloud data. The point may be predicted based on a point of a reference frame related to the current frame, and the point of the reference frame may be a closest or second closest point to the point.

The predicting the point may include predicting the point based on an azimuth and a radius of the point cloud data and using a radius of a first node of the point cloud data distributed based on the azimuth and the radius, or predicting the point based on the azimuth and the radius of the point cloud data and generating a radius list including radii of one or more points of the azimuth.

The predicting the point may include detecting a point from the reference frame based on a laser ID and an azimuth of a previously processed point prior to coding a current point of the current frame and detecting a predictor of the point based on an upper bound of an azimuth of the point of the reference frame, or detecting the predictor of the point based on an upper bound of the upper bound of the azimuth of the point of the reference frame.

The predicting the point may include detecting a point having a closest radius to a radius of the previously processed point from the reference frame, detecting a point having a larger radius than the closest radius to the radius of the previously processed point from the reference frame, or detecting a point having a smaller radius than the closest radius to the radius of the previously processed point from the reference frame.

The bitstream may include parameters related to prediction of the point. The parameters may include information about whether to perform radius prediction from the reference frame, information about a size of a radius list for the radius prediction, and information about a prediction mode of the point.

The point cloud data reception method may be performed by the reception device. The reception device may include a receiver that receives a signal and a decoder. The reception device may correspond to a decoder or may be a device including a processor that performs decoding and a memory.

The reception device may include a receiver that receives a bitstream including point cloud data; and a decoder that decodes the point cloud data.

The method/device according to the embodiments includes a method of predicting radius information for inter-frame movement prediction in a predictive geometry method of point cloud content. Prediction accuracy is improved by further considering a radius in addition to only an azimuth and a laser ID. By predicting a node through a previously predicted frame, an encoding time that occurs in a tree generation process may be reduced. As a residual decreases, the size of a bitstream decreases.

Therefore, the method/device according to the embodiments detects a predictive point by considering all of the laser ID, the azimuth, and the radius when performing inter-prediction, thereby performing accurate prediction.

Further, since the size may be additionally signaled when a radius list is generated, radius prediction may be adaptively performed.

Furthermore, various prediction modes may be supported by generating a radius list of points based on an upper bound of a quantized azimuth of a reference point and predicting an actual difference of radii between points.

Embodiments have been described from the method and/or device perspective, and descriptions of methods and devices may be applied so as to complement each other.

Although the accompanying drawings have been described separately for simplicity, it is possible to design new embodiments by merging the embodiments illustrated in the respective drawings. Designing a recording medium readable by a computer on which programs for executing the above-described embodiments are recorded as needed by those skilled in the art also falls within the scope of the appended claims and their equivalents. The devices and methods according to embodiments may not be limited by the configurations and methods of the embodiments described above. Various modifications can be made to the embodiments by selectively combining all or some of the embodiments. Although preferred embodiments have been described with reference to the drawings, those skilled in the art will appreciate that various modifications and variations may be made in the embodiments without departing from the spirit or scope of the disclosure described in the appended claims. Such modifications are not to be understood individually from the technical idea or perspective of the embodiments.

Various elements of the devices of the embodiments may be implemented by hardware, software, firmware, or a combination thereof. Various elements in the embodiments may be implemented by a single chip, for example, a single hardware circuit. According to embodiments, the components according to the embodiments may be implemented as separate chips, respectively. According to embodiments, at least one or more of the components of the device according to the embodiments may include one or more processors capable of executing one or more programs. The one or more programs may perform any one or more of the operations/methods according to the embodiments or include instructions for performing the same. Executable instructions for performing the method/operations of the device according to the embodiments may be stored in a non-transitory CRM or other computer program products configured to be executed by one or more processors, or may be stored in a transitory CRM or other computer program products configured to be executed by one or more processors. In addition, the memory according to the embodiments may be used as a concept covering not only volatile memories (e.g., RAM) but also nonvolatile memories, flash memories, and PROMs. In addition, it may also be implemented in the form of a carrier wave, such as transmission over the Internet. In addition, the processor-readable recording medium may be distributed to computer systems connected over a network such that the processor-readable code may be stored and executed in a distributed fashion.

In this specification, the term "/" and "," should be interpreted as indicating "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C." Further, in this specification, the term "or" should be interpreted as indicating "and/or." For instance, the expression "A or B" may mean 1) only A, 2) only B, or 3) both A and B. In other words, the term "or"

used in this document should be interpreted as indicating "additionally or alternatively."

Terms such as first and second may be used to describe various elements of the embodiments. However, various components according to the embodiments should not be limited by the above terms. These terms are only used to distinguish one element from another. For example, a first user input signal may be referred to as a second user input signal. Similarly, the second user input signal may be referred to as a first user input signal. Use of these terms should be construed as not departing from the scope of the various embodiments. The first user input signal and the second user input signal are both user input signals, but do not mean the same user input signals unless context clearly dictates otherwise.

The terms used to describe the embodiments are used for the purpose of describing specific embodiments, and are not intended to limit the embodiments. As used in the description of the embodiments and in the claims, the singular forms "a", "an", and "the" include plural referents unless the context clearly dictates otherwise. The expression "and/or" is used to include all possible combinations of terms. The terms such as "includes" or "has" are intended to indicate existence of figures, numbers, steps, elements, and/or components and should be understood as not precluding possibility of existence of additional existence of figures, numbers, steps, elements, and/or components. As used herein, conditional expressions such as "if" and "when" are not limited to an optional case and are intended to be interpreted, when a specific condition is satisfied, to perform the related operation or interpret the related definition according to the specific condition.

Operations according to the embodiments described in this specification may be performed by a transmission/reception device including a memory and/or a processor according to embodiments. The memory may store programs for processing/controlling the operations according to the embodiments, and the processor may control various operations described in this specification. The processor may be referred to as a controller or the like. In embodiments, operations may be performed by firmware, software, and/or a combination thereof. The firmware, software, and/or a combination thereof may be stored in the processor or the memory.

The operations according to the above-described embodiments may be performed by the transmission device and/or the reception device according to the embodiments. The transmission/reception device includes a transmitter/receiver configured to transmit and receive media data, a memory configured to store instructions (program code, algorithms, flowcharts and/or data) for a process according to embodiments, and a processor configured to control operations of the transmission/reception device.

The processor may be referred to as a controller or the like, and may correspond to, for example, hardware, software, and/or a combination thereof. The operations according to the above-described embodiments may be performed by the processor. In addition, the processor may be implemented as an encoder/decoder for the operations of the above-described embodiments.

Mode for Disclosure

As described above, related contents have been described in the best mode for carrying out the embodiments.

INDUSTRIAL APPLICABILITY

As described above, the embodiments may be fully or partially applied to the point cloud data transmission/reception device and system.

It will be apparent to those skilled in the art that various changes or modifications can be made to the embodiments within the scope of the embodiments.

Thus, it is intended that the embodiments cover the modifications and variations of this disclosure provided they come within the scope of the appended claims and their equivalents.

The invention claimed is:

1. A method of encoding point cloud data, the method comprising:

encoding geometry data of point cloud data based on a predictive tree and a reference frame, wherein the geometry data is predicted based on a radius for a node of the predictive tree; and encoding attribute data of the point cloud data, wherein the geometry data and the attribute data are included in a bitstream, wherein the bitstream includes:

first information for specifying a prediction method for the point cloud data, and second information for specifying information related to a radius to predict the node.

2. The method of claim 1, wherein a point of the reference frame is a closest or second closest point to the point.

3. The method of claim 2, wherein the geometry data is predicted based on an azimuth and a radius of the point cloud data and using a radius of a first node of the point cloud data distributed based on the azimuth and the radius; or wherein the geometry data is predicted based on the azimuth and the radius of the point cloud data and generating a radius list including radii of one or more points of the azimuth.

4. The method of claim 2, wherein the geometry data is detected a point from the reference frame based on a laser ID and an azimuth of a previously processed point prior to coding a current point of the current frame and wherein a predictor is detected a predictor of the point based on an upper bound of an azimuth of the point of the reference frame; or wherein the predictor is detected based on an upper bound of the upper bound of the azimuth of the point of the reference frame.

5. The method of claim 4, wherein a point having a closest radius to a radius of the previously processed point from the reference frame is detected, wherein a point having a larger radius than the closest radius to the radius of the previously processed point from the reference frame is detected, or wherein a point having a smaller radius than the closest radius to the radius of the previously processed point from the reference frame is detected.

6. The method of claim 2, wherein the bitstream includes parameters related to prediction of the geometry data, and wherein the parameters include information about whether to perform radius prediction from the reference frame, information about a size of a radius list for the radius prediction, and information about a prediction mode of the point.

7. A device for encoding point cloud data, the device comprising:

a memory; and at least one processor connected to the memory, the at least one processor configured to:

encode geometry data of point cloud data based on a predictive tree and a reference frame, wherein the geometry data is predicted based on a radius for a node of the predictive tree; and encode attribute data of the point cloud data, wherein the geometry data and the attribute data are included in a bitstream, wherein the bitstream includes:

first information for specifying a prediction method for the point cloud data, and second information for specifying information related to a radius to predict the node.

8. A method of decoding point cloud data, the method comprising:

decoding geometry data of point cloud data in a bitstream based on a predictive tree and a reference frame, wherein the geometry data is predicted based on a radius for a node of the predictive tree; and decoding attribute data of the point cloud data, wherein the bitstream includes:

first information for specifying a prediction method for the point cloud data, and second information for specifying information related to a radius to predict the node.

9. The method of claim 8, wherein a point of the reference frame is a closest or second closest point to the point.

10. The method of claim 9, wherein the geometry data is predicted based on an azimuth and a radius of the point cloud data and using a radius of a first node of the point cloud data distributed based on the azimuth and the radius; or wherein the geometry data is predicted based on the azimuth and the radius of the point cloud data and generating a radius list including radii of one or more points of the azimuth.

11. The method of claim 9, wherein the geometry data is detected from the reference frame based on a laser ID and an azimuth of a previously processed point prior to coding a current point of a current frame and wherein a predictor is detected a predictor of the point based on an upper bound of an azimuth of the point of the reference frame; or wherein the predictor is detected based on an upper bound of the upper bound of the azimuth of the point of the reference frame.

12. The method of claim 11, wherein a point having a closest radius to a radius of the previously processed point from the reference frame is detected, wherein a point having a larger radius than the closest radius to the radius of the previously processed point from the reference frame is detected, or wherein a point having a smaller radius than the closest radius to the radius of the previously processed point from the reference frame is detected.

13. The method of claim 9, wherein the bitstream includes parameters related to prediction of the geometry data, and wherein the parameters include information about whether to perform radius prediction from the reference frame, information about a size of a radius list for the radius prediction, and information about a prediction mode of the point.

14. A device for decoding point cloud data, the device comprising:

a memory; and at least one processor connected to the memory, the at least one processor configured to:

decode geometry data of point cloud data in a bitstream based on a predictive tree and a reference frame, wherein the geometry data is predicted based on a radius for a node of the predictive tree; and decode attribute data of the point cloud data, wherein the bitstream includes:

first information for specifying a prediction method for the point cloud data, and second information for specifying information related to a radius to predict the node.

\* \* \* \* \*